US011903891B2

(12) United States Patent
Kim

(10) Patent No.: US 11,903,891 B2
(45) Date of Patent: Feb. 20, 2024

(54) REHABILITATION EXERCISE DEVICE FOR UPPER AND LOWER LIMBS

(71) Applicant: H ROBOTICS INC., Pohang-si (KR)

(72) Inventor: Ho-Moon Kim, Suwon-si (KR)

(73) Assignee: H ROBOTICS INC., Pohang-si (KR)

( * ) Notice: Subject to any disclaimer, the term of this patent is extended or adjusted under 35 U.S.C. 154(b) by 324 days.

(21) Appl. No.: 17/059,413

(22) PCT Filed: Nov. 2, 2020

(86) PCT No.: PCT/KR2020/015123

§ 371 (c)(1),
(2) Date: Nov. 27, 2020

(87) PCT Pub. No.: WO2021/096129

PCT Pub. Date: May 20, 2021

(65) Prior Publication Data

US 2022/0339052 A1 Oct. 27, 2022

(30) Foreign Application Priority Data

Nov. 15, 2019 (KR) ........................ 10-2019-0146775
Feb. 25, 2020 (KR) ........................ 10-2020-0022968
Apr. 10, 2020 (KR) ........................ 10-2020-0043956

(51) Int. Cl.
*A61H 1/02* (2006.01)

(52) U.S. Cl.
CPC ........... *A61H 1/024* (2013.01); *A61H 1/0277* (2013.01); *A61H 2201/1638* (2013.01); *A61H 2201/1642* (2013.01); *A61H 2201/1676* (2013.01)

(58) Field of Classification Search
CPC .................. A61H 1/024; A61H 1/0277; A61H 2201/1638; A61H 2201/1642; A61H 2201/1676; A61H 1/0266; A61H 2201/0157; A61H 2201/0161; A61H 2201/0192; A61H 2201/1215; A61H 2201/14; A61H 2201/5064; A61H 2201/5097; A61H 1/0285; A61H 1/0237
See application file for complete search history.

(56) References Cited

U.S. PATENT DOCUMENTS 4,930,497 A * 6/1990 Saringer .............. A61H 1/0259 601/34
2009/0093353 A1* 4/2009 Weiner ................... A61H 1/024 482/130
2010/0248903 A1* 9/2010 Cardile .............. A63B 21/0058 482/51

* cited by examiner

*Primary Examiner* — Quang D Thanh
(74) *Attorney, Agent, or Firm* — QUANTUM PATENT LAW FIRM; Seongyoune Kang

(57) ABSTRACT

A rehabilitation exercise device for upper and lower limbs is provided. The rehabilitation exercise device includes: a first support supporting a user's hand or foot; a second support supporting a user's forearm or calf; a pair of first hinges rotatably connecting the first support and the second support to each other; a third support supporting a user's upper arm or thigh; a pair of second hinges rotatably connecting the second support and the third support to each other; and a distance adjustment part configured to adjust a distance between the first support and the third support by adjusting length of the second support.

14 Claims, 28 Drawing Sheets

[FIG. 1]
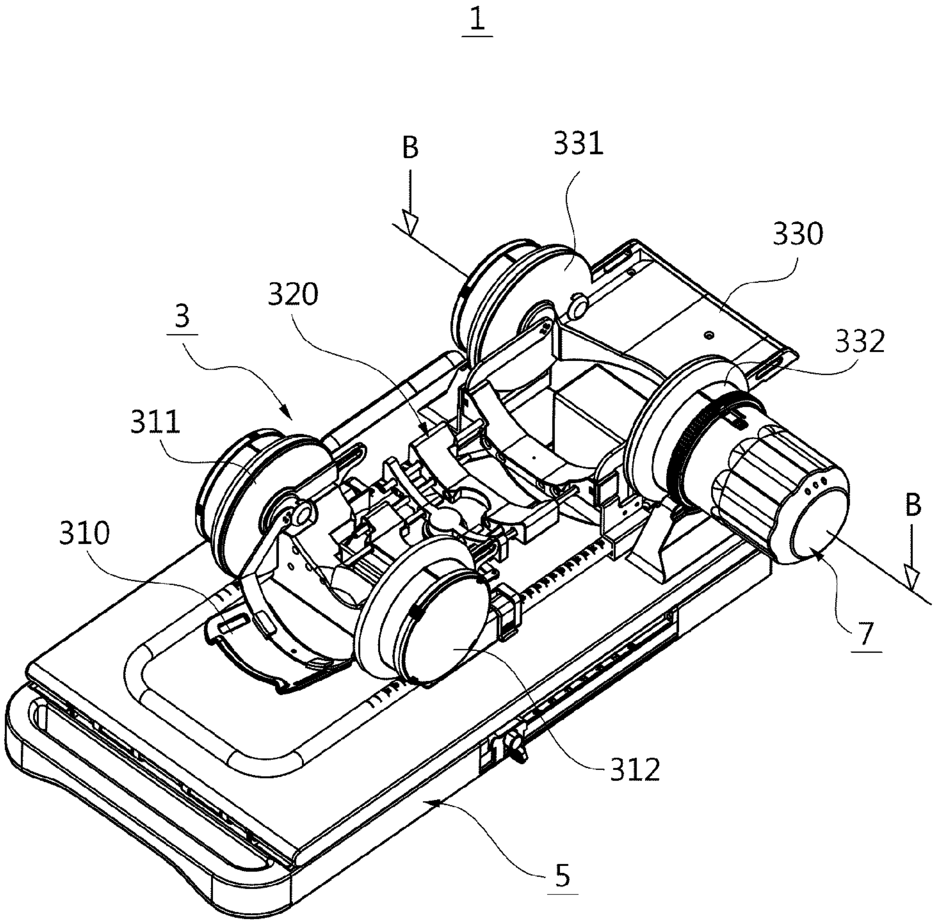

[FIG. 2]
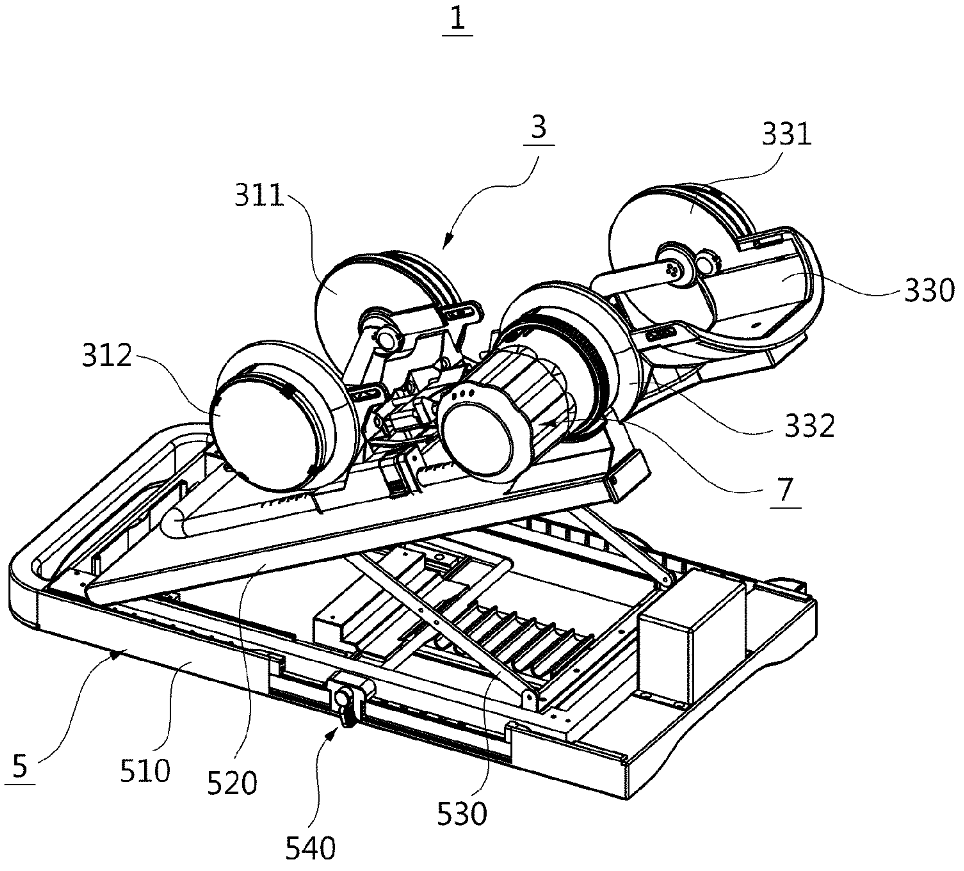

[FIG. 3]
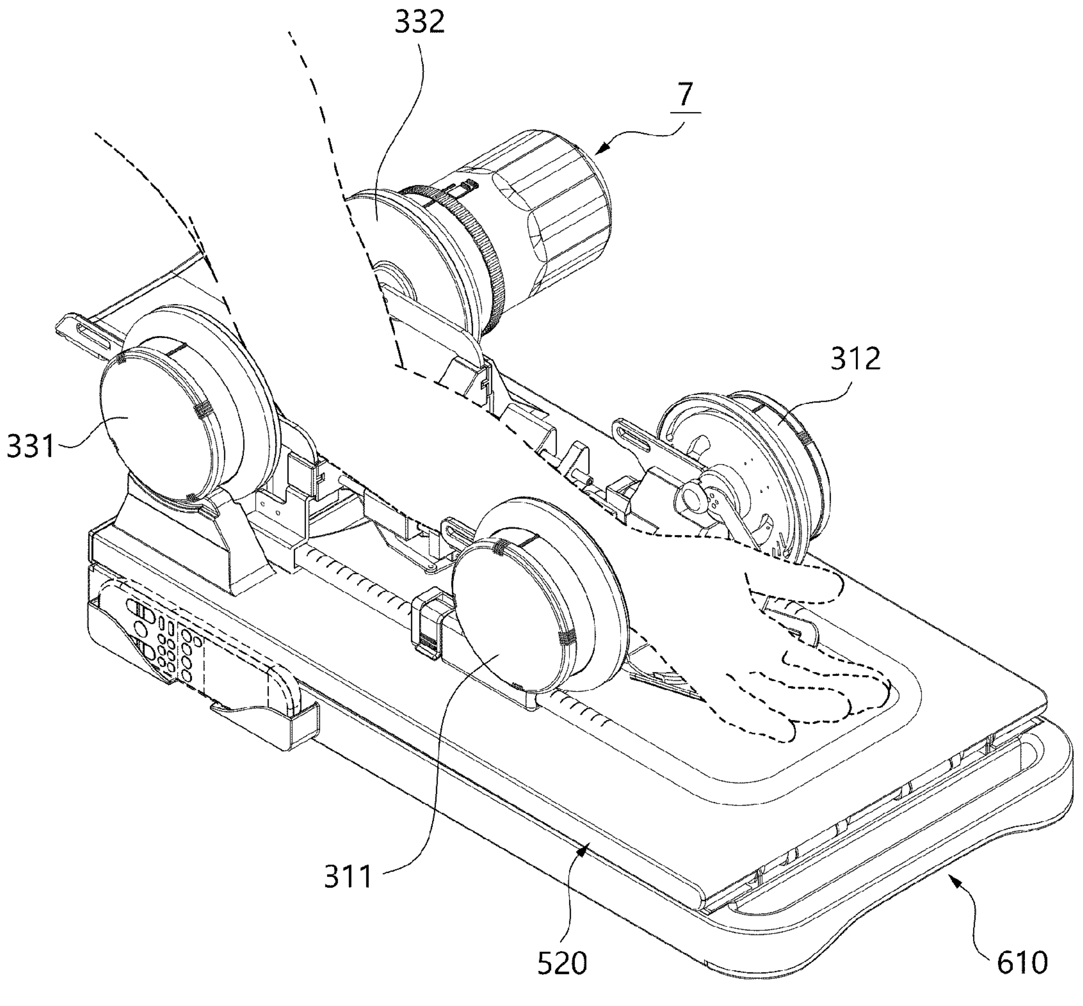

[FIG. 4]
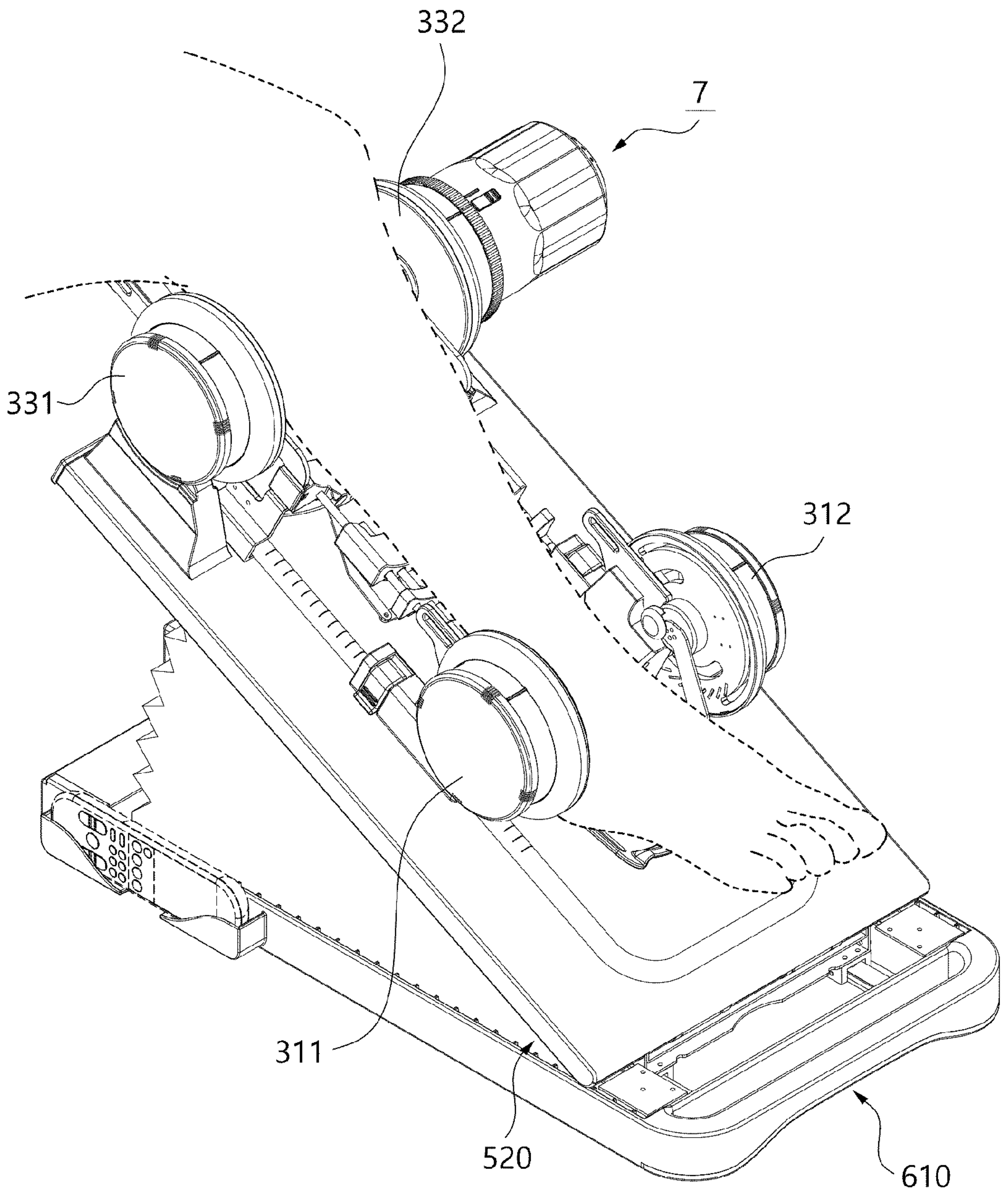

[FIG. 5]
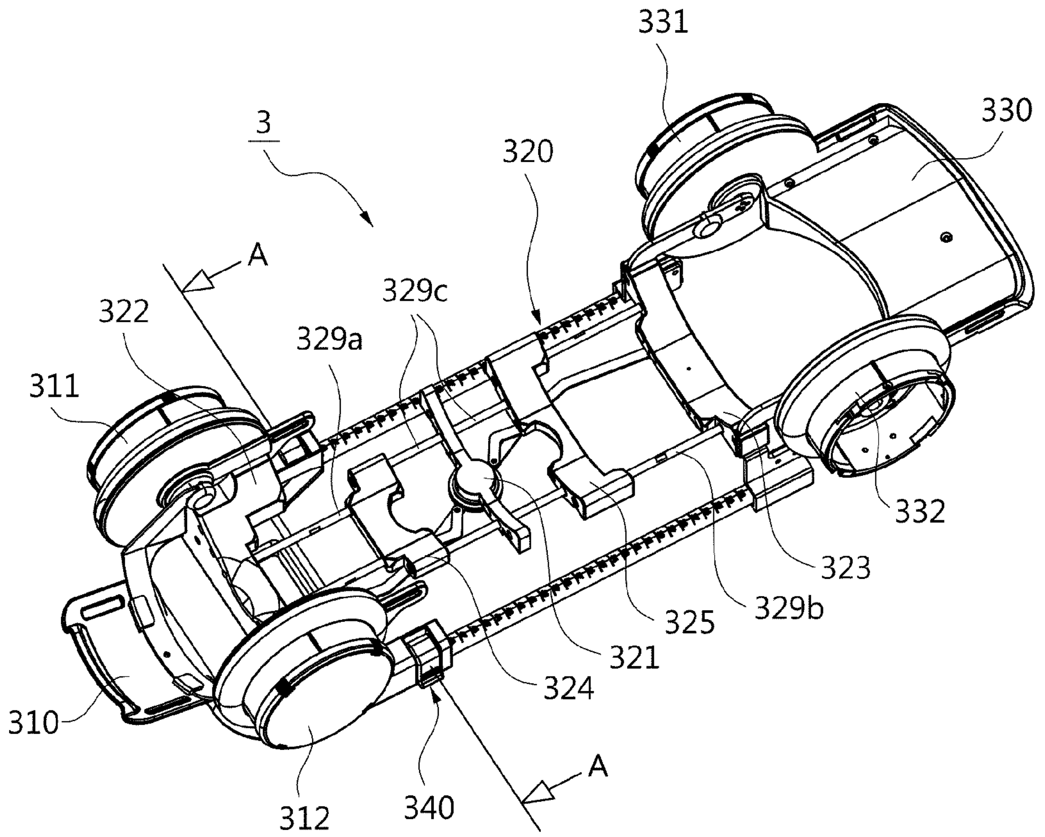

[FIG. 6]
(a)
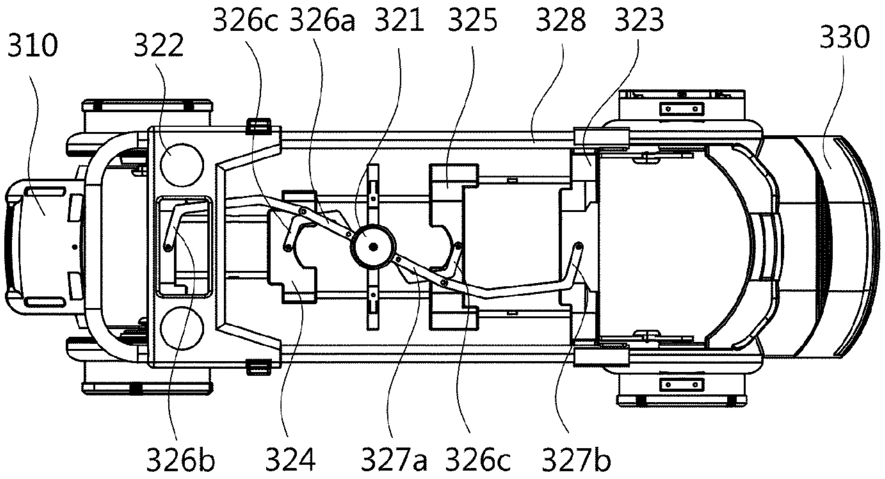
(b)
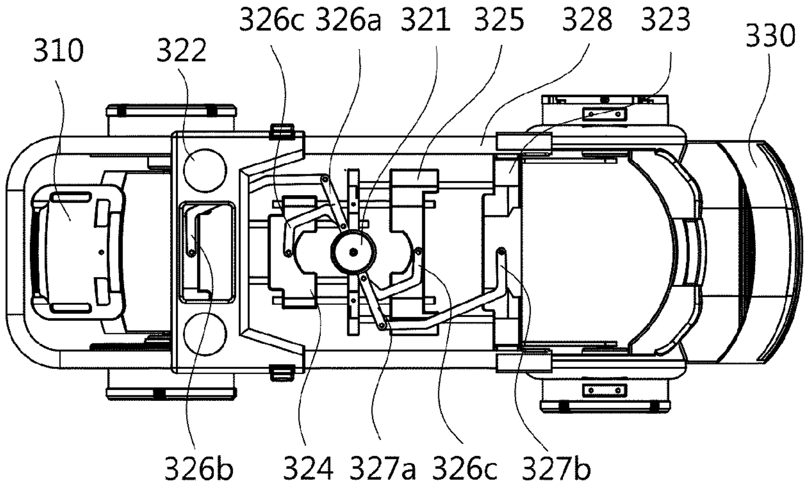

[FIG. 7]
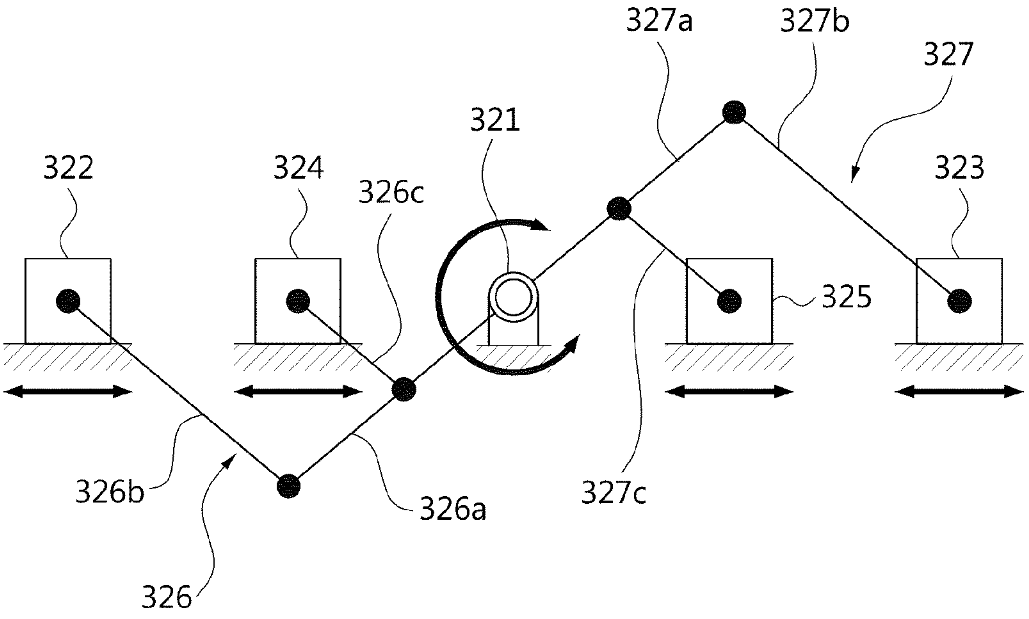

[FIG. 8]
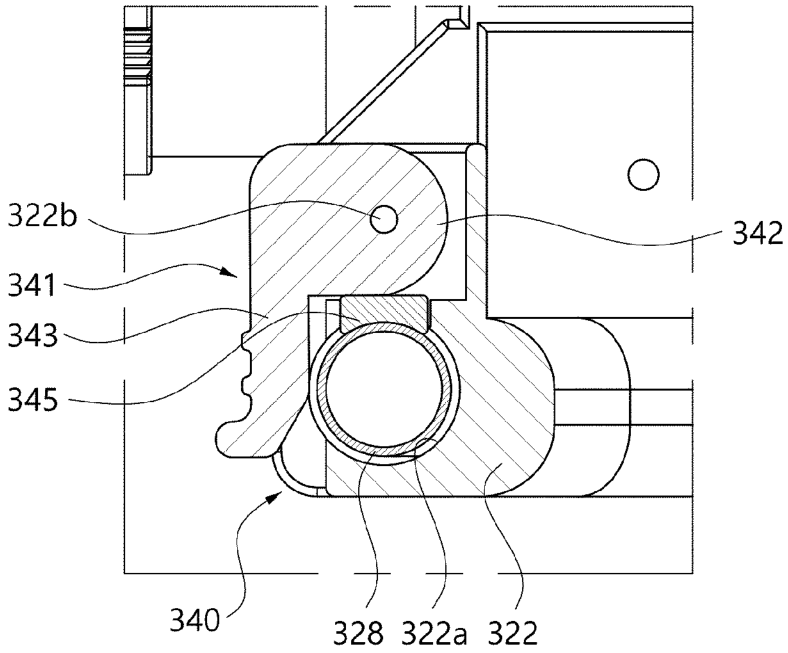

[FIG. 9]
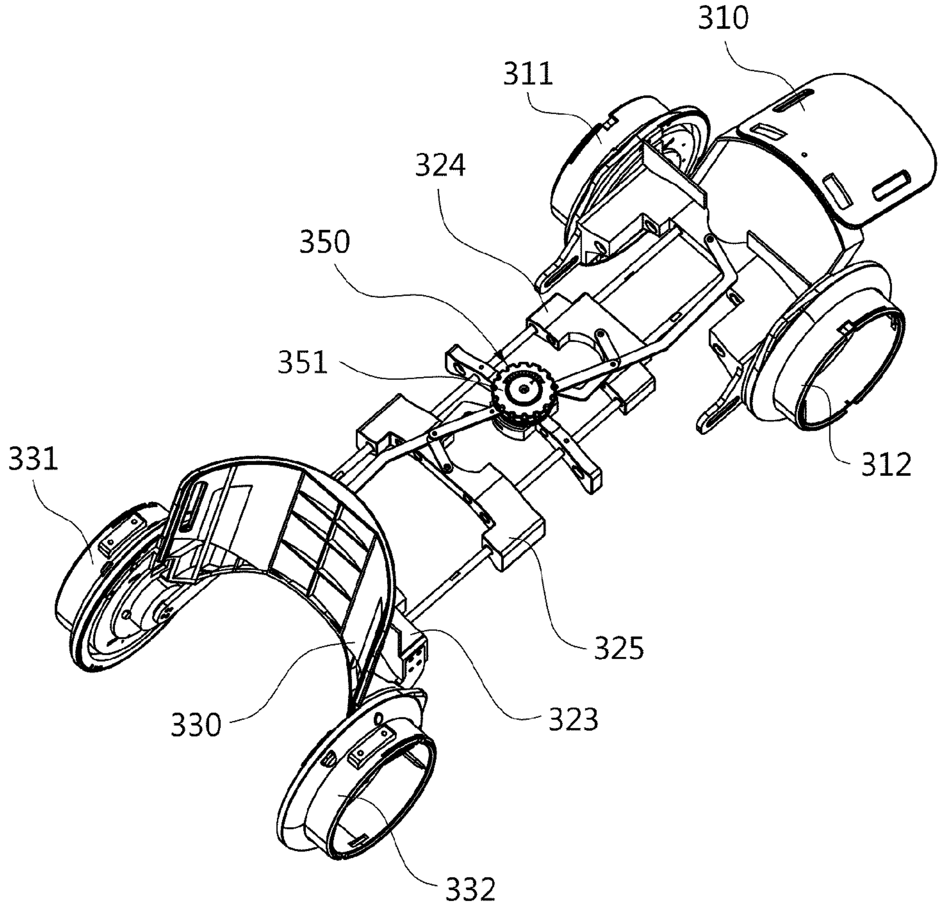

[FIG. 10]
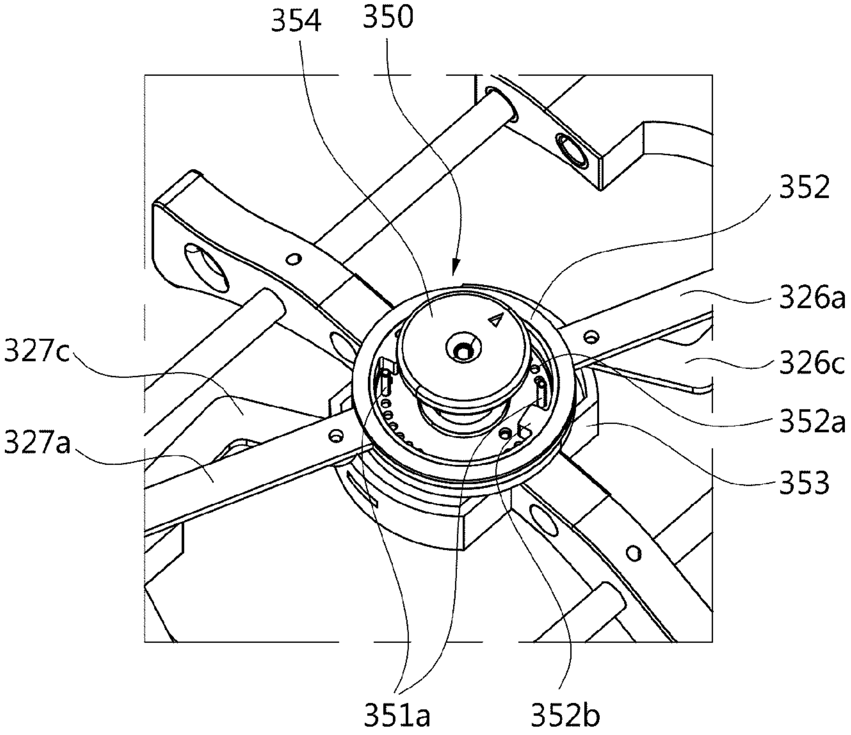

[FIG. 11]
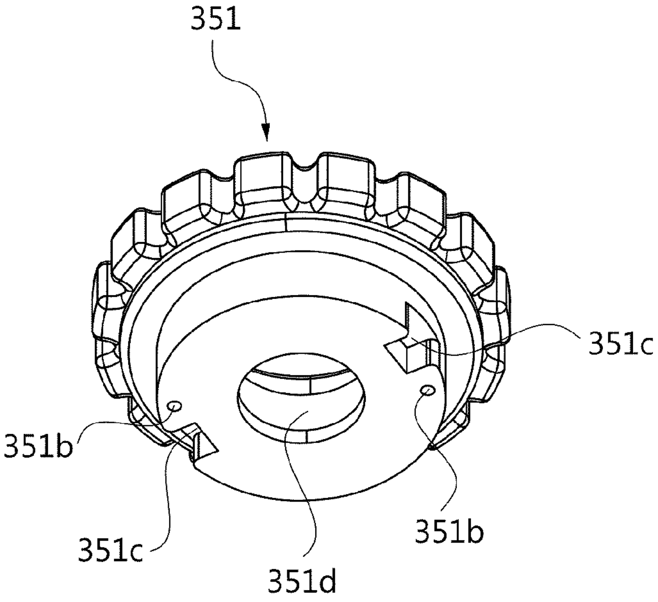

[FIG. 12]
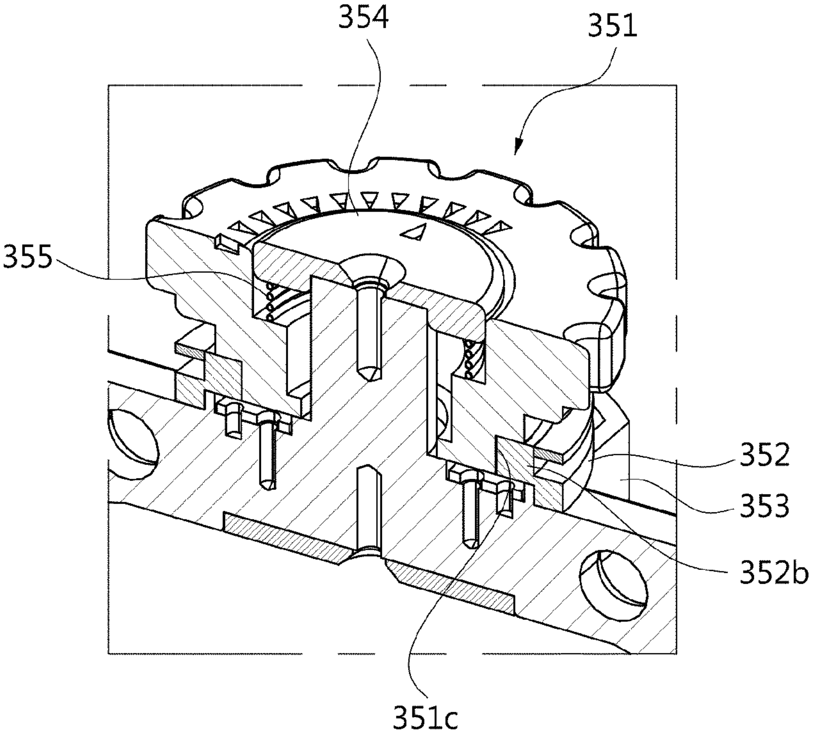

[FIG. 13]
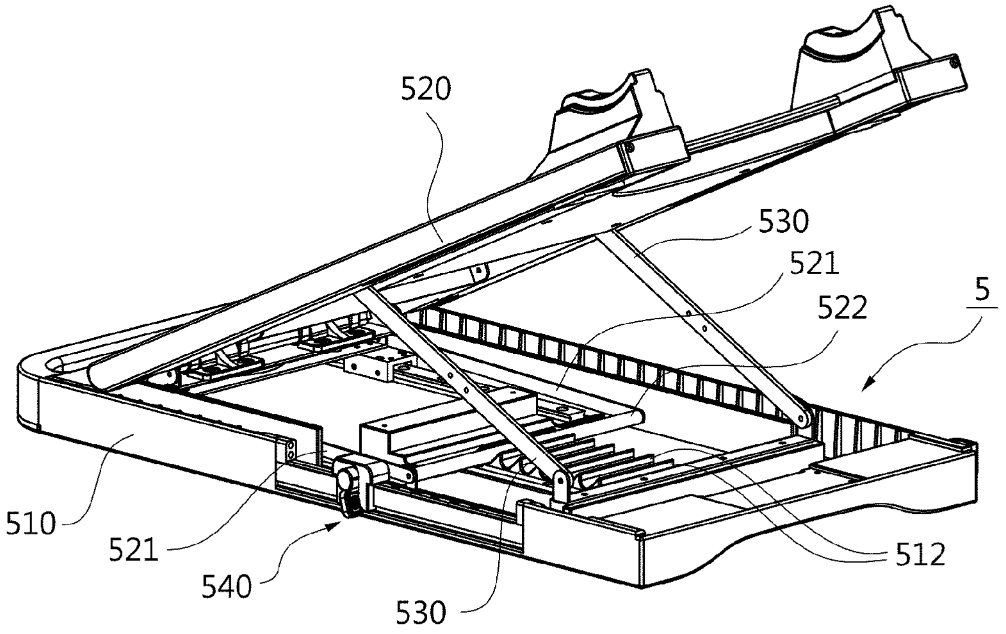

[FIG. 14]
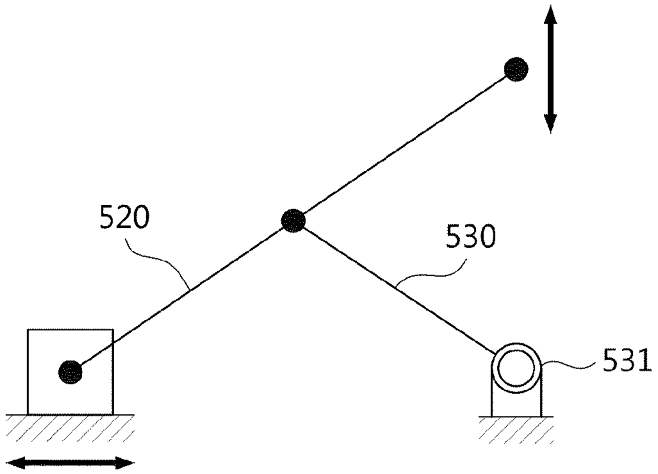

[FIG. 15]
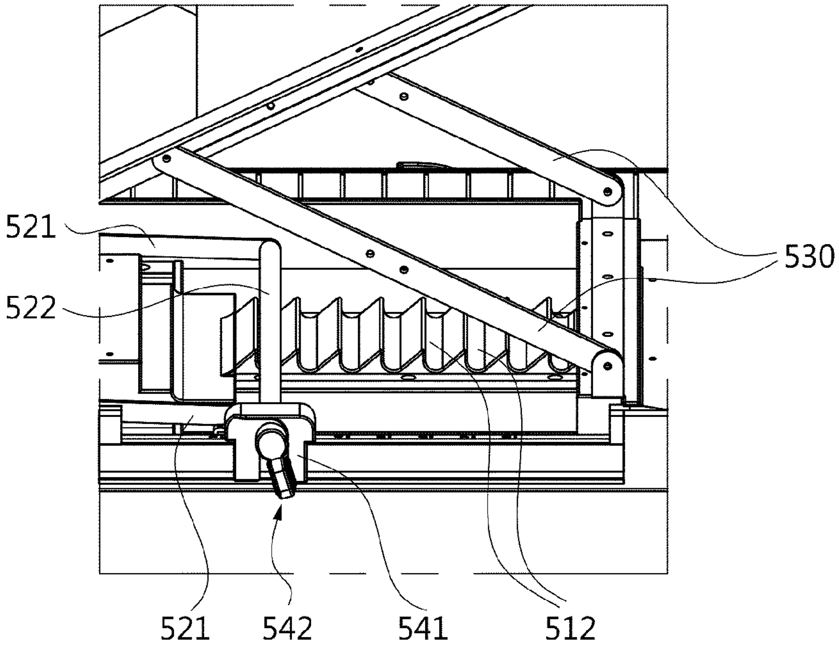

[FIG. 16]
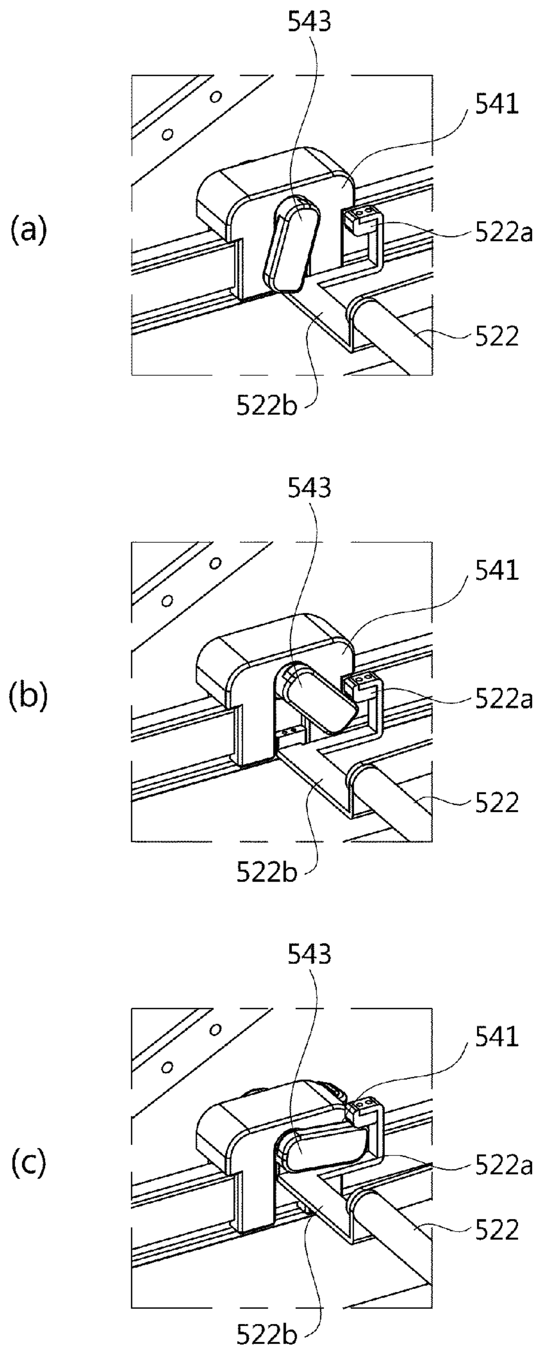

[FIG. 17]
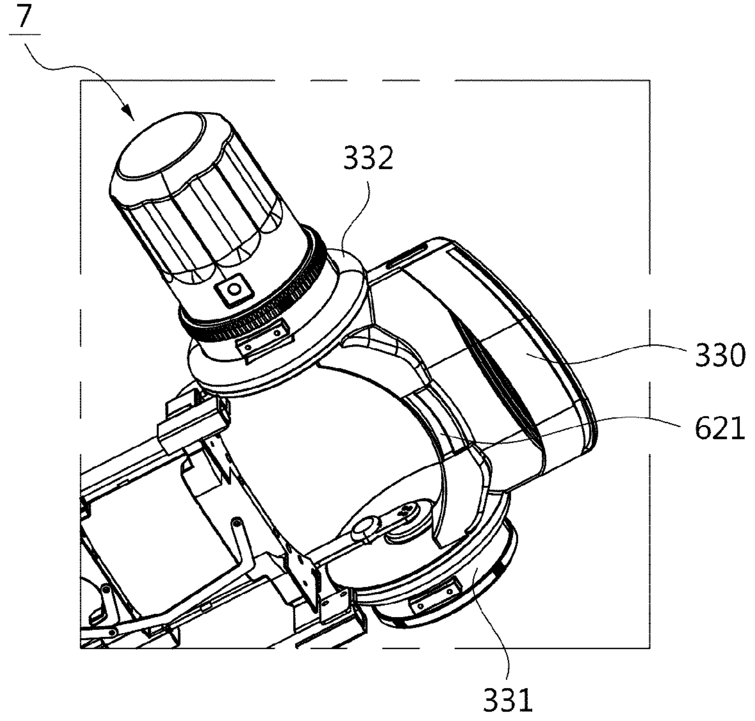

[FIG. 18]
(a)
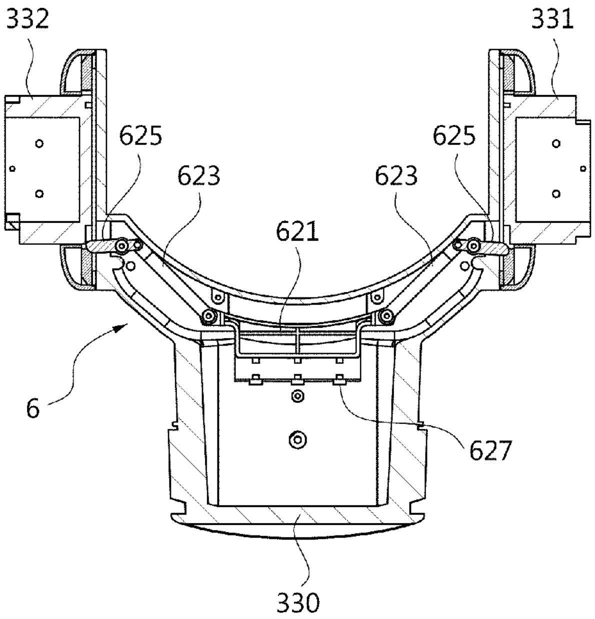
(b)
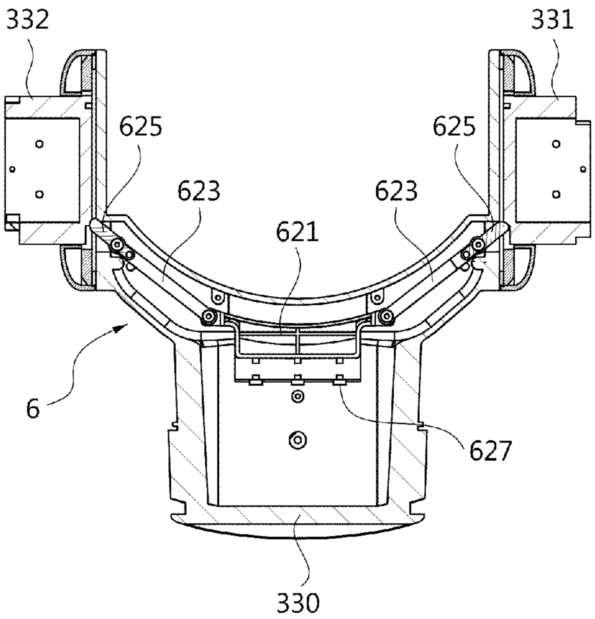

[FIG. 19]
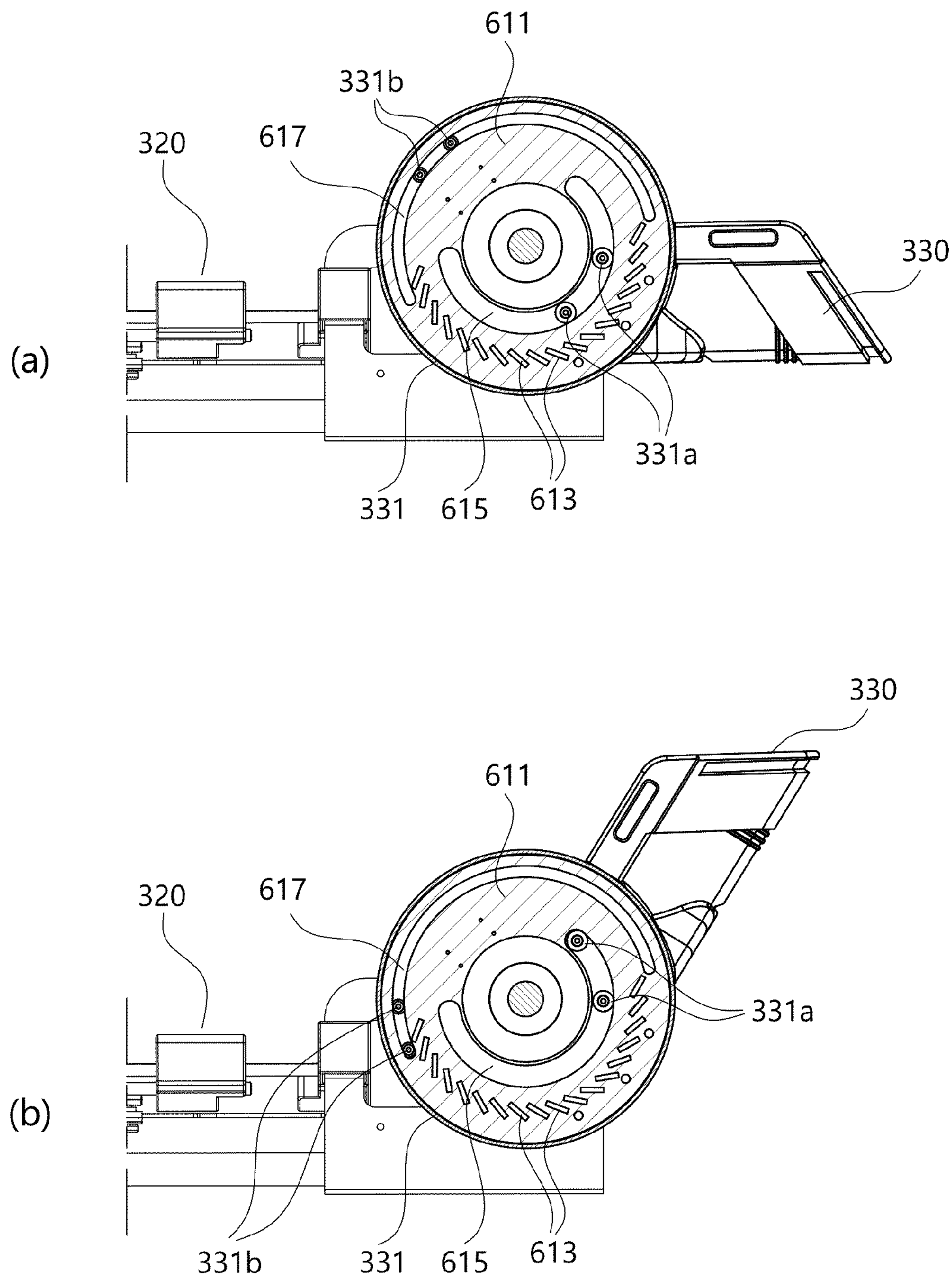

[FIG. 20]
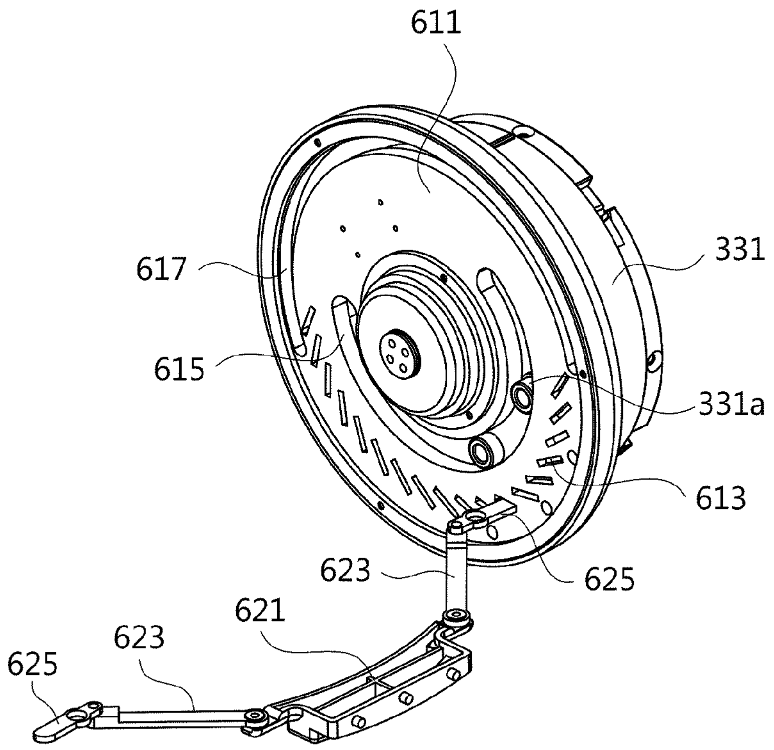

[FIG. 21]
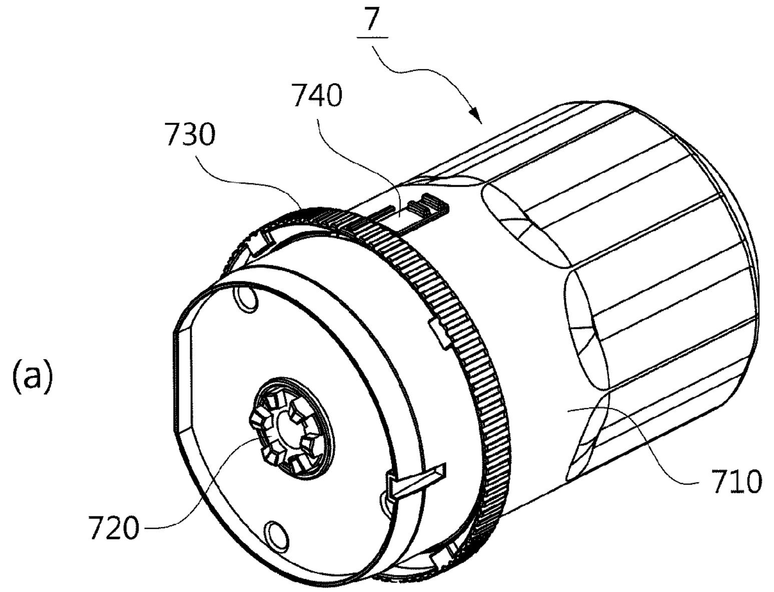
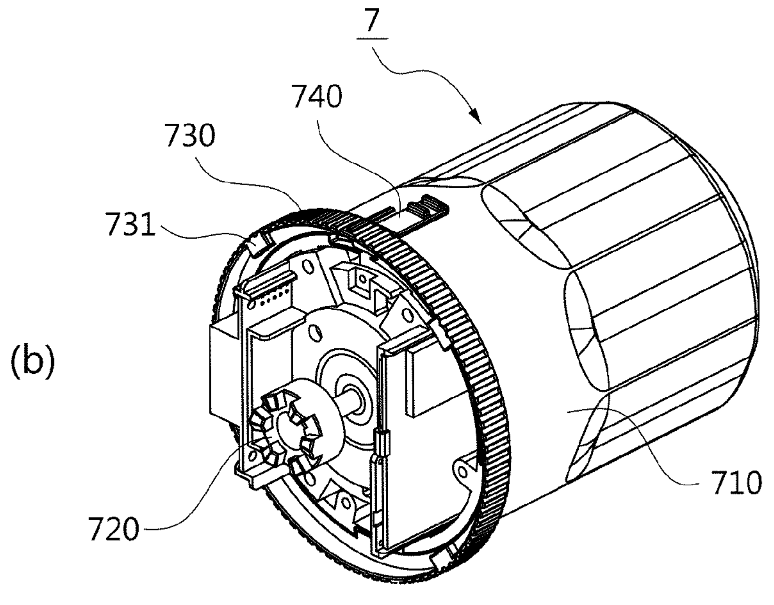

[FIG. 22]
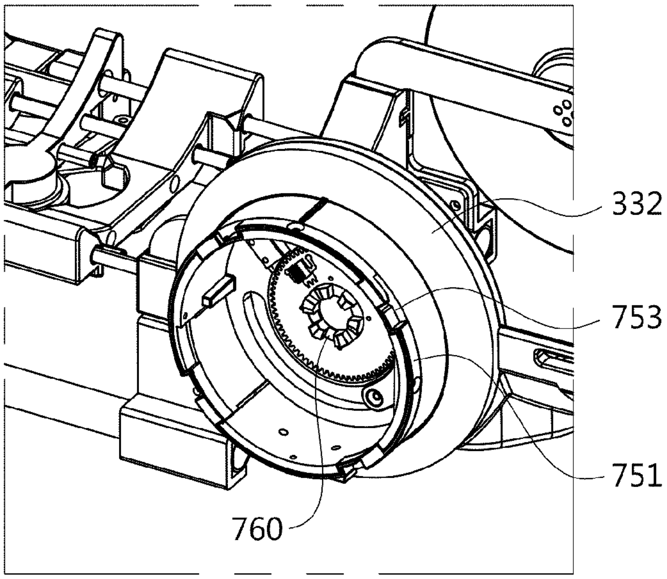

[FIG. 23]
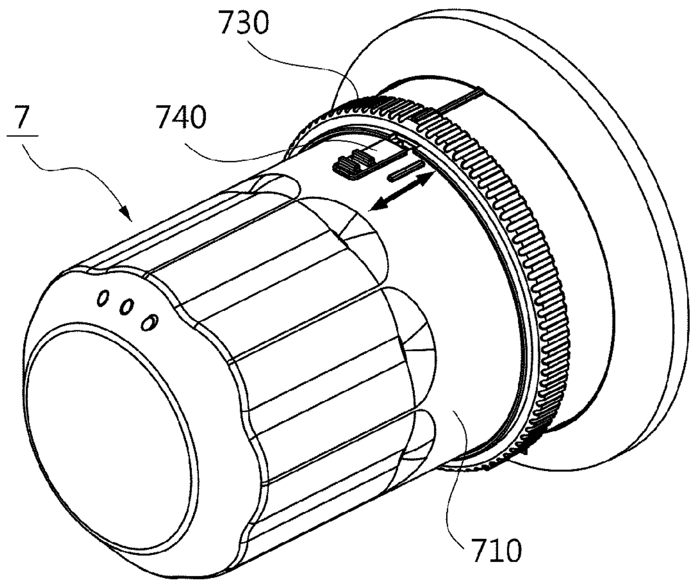

[FIG. 24]
(a)
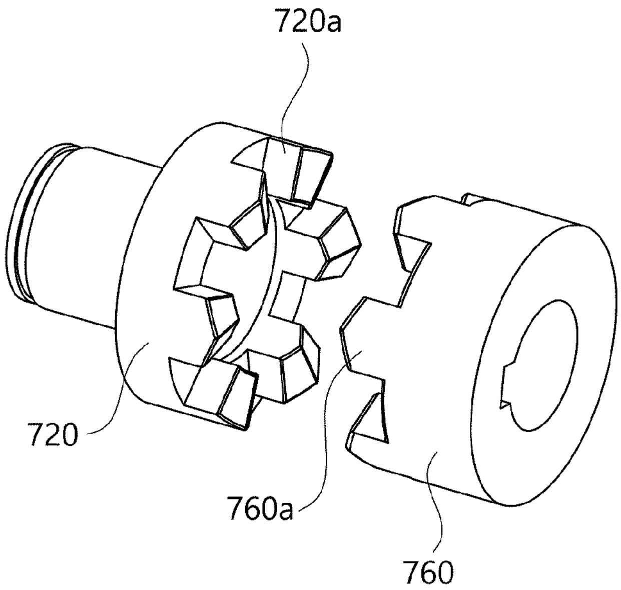
(b)
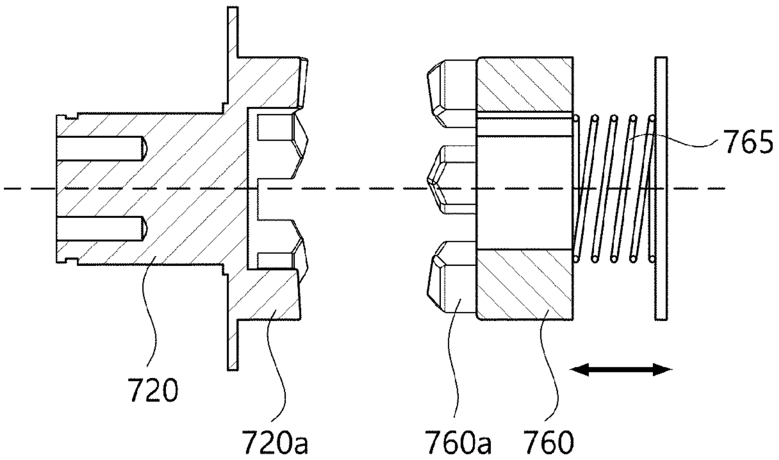

[FIG. 25]
(a)
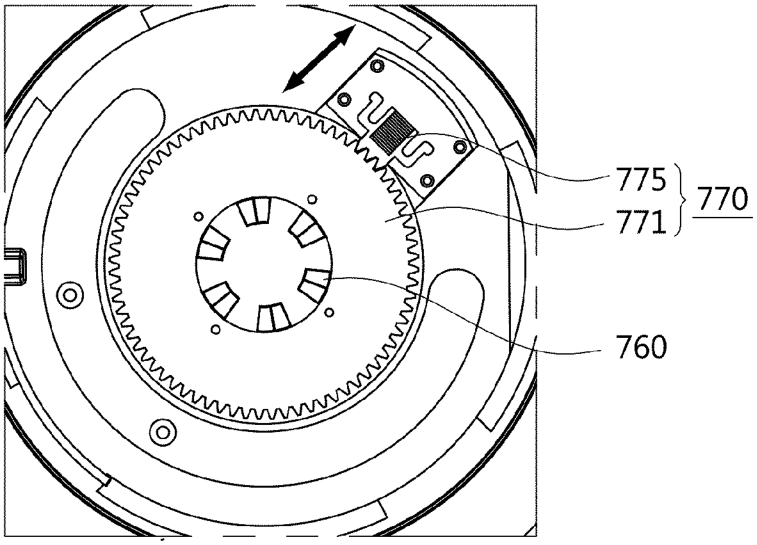
(b)
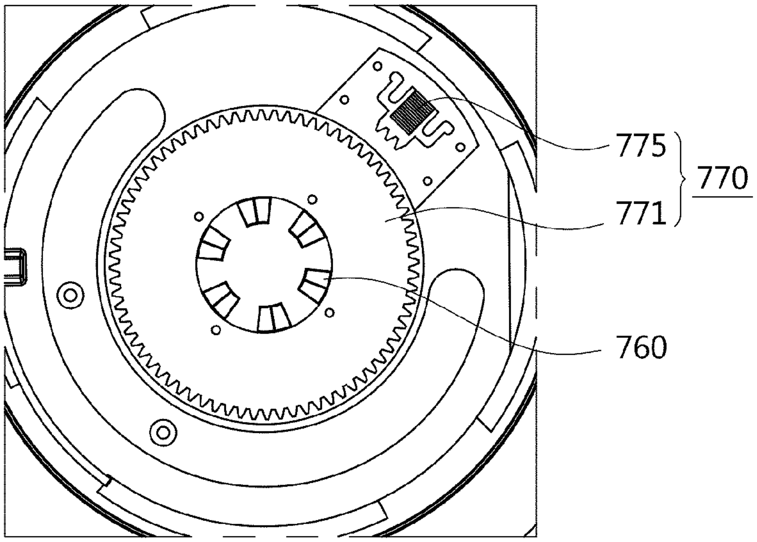

[FIG. 26]
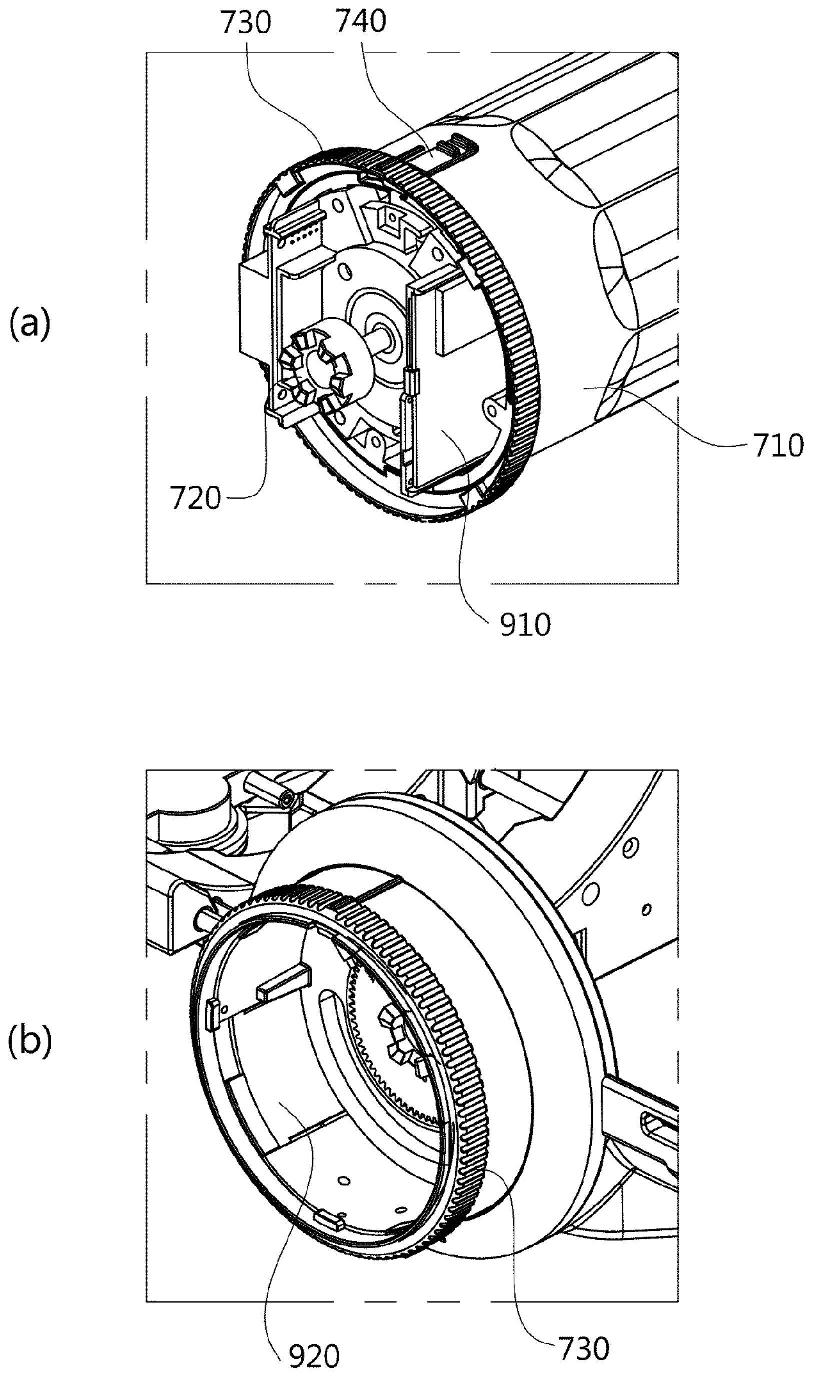

[FIG. 27]
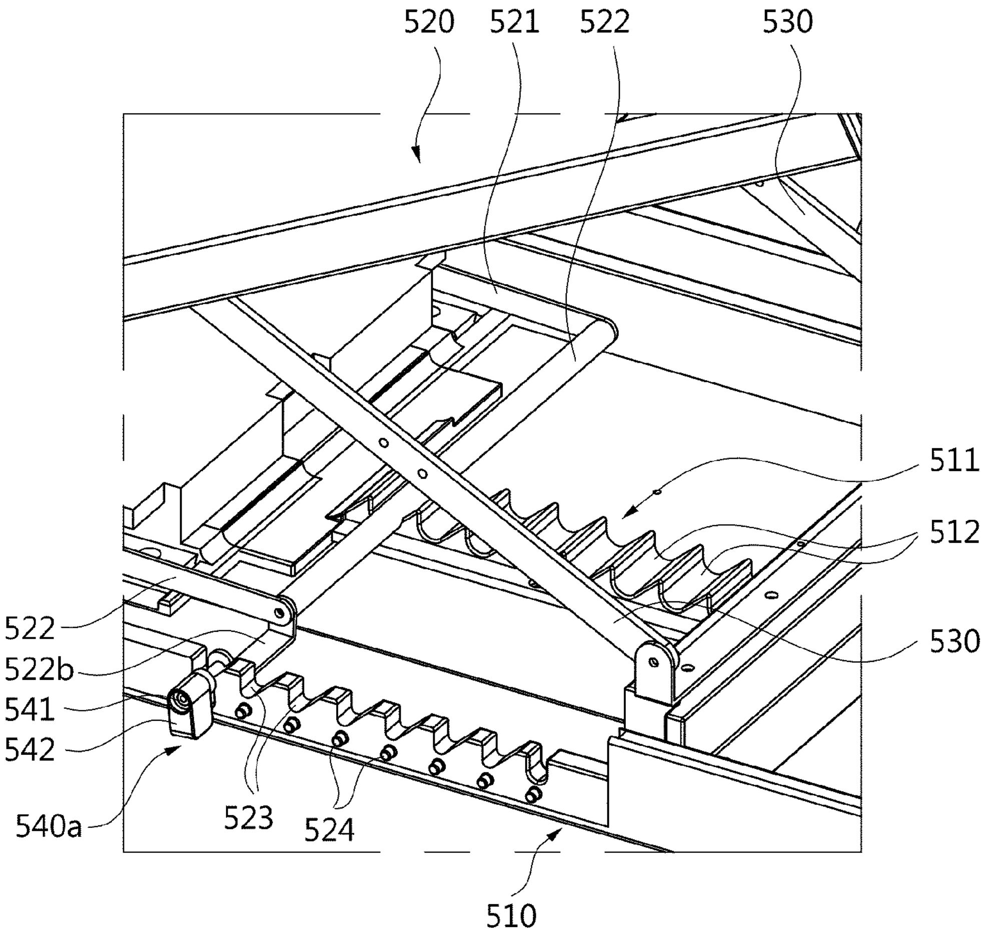

[FIG. 28]
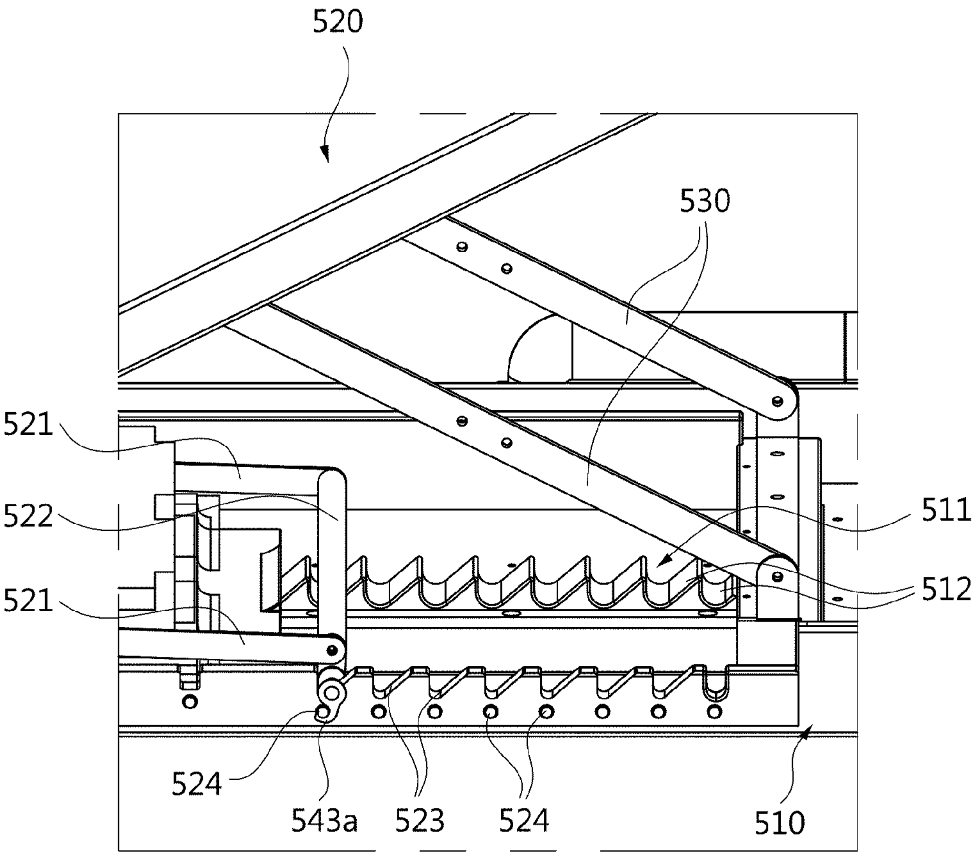

REHABILITATION EXERCISE DEVICE FOR UPPER AND LOWER LIMBS

CROSS-REFERENCE TO RELATED APPLICATIONS

This patent application is a U.S. national stage application of International Application No. PCT/KR2020/015123, filed Nov. 2, 2020 and the entire contents of which are incorporated herein by reference, which claims priority to Korean Application No. 10-2019-0146775, filed Nov. 15, 2019 and the entire contents of which are incorporated herein by reference, Korean Application No. 10-2020-0022968, filed Feb. 25, 2020 and the entire contents of which are incorporated herein by reference, and Korean Application No. 10-2020-0043956, filed Apr. 10, 2020 and the entire contents of which are incorporated herein by reference.

BACKGROUND OF THE INVENTION

Field of the Invention

The present disclosure relates generally to a rehabilitation exercise device for upper and lower limbs. More particularly, the present disclosure relates to a rehabilitation exercise device for upper and lower limbs, capable of enabling a user to perform an upper or lower limb rehabilitation exercise by placing his/her upper or lower limb thereon.

Description of the Related Art

In general, each joint of a human body has a structure in which neighboring parts of the joint are rotatable with respect to the joint.

Meanwhile, people such as the elderly or rehabilitation patients with weak muscles have difficulty in moving their joints normally compared to healthy people, and even though they need exercise, it is difficult for them to exercise with typical exercise equipment in reality.

When a muscle is weakened or a damaged joint is left unattended over time, the muscle or joint becomes gradually stiff, causing pain when moving, which may interfere with normal activities even when damaged nerves recover.

In addition, patients who have undergone wrist and/or shoulder joint surgery have difficulty exercising by themselves, so joints of the wrist and/or shoulder may become stiff as muscles are weakened and nutrition supply is poor.

Thus, in order to prevent joint deformity and return to normal activities, affected people need to perform rehabilitation exercises accompanied by pain for a long period of time.

In an effort to solve this problem, as a related-art rehabilitation exercise device for enabling the elderly or rehabilitation patients with weak muscles to perform joint exercises through passive rehabilitation, a robotic shoulder apparatus for stroke patient's rehabilitation has been disclosed in Korean Patent No. 10-1163903.

Such a rehabilitation exercise device disclosed in the related art has an unnecessarily complex structure, and thus is problematic in that it is difficult to provide benefits to more users because they need to bear the cost of purchase and installation. In addition, the rehabilitation exercise device is difficult to move, so most users need to move for exercise to the place where the device is located, which is cumbersome.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent No. 10-1163903 (Title of invention: robotic shoulder apparatus for stroke patient's rehabilitation, registration date: 2012.07.02)

SUMMARY OF THE INVENTION

Accordingly, the present disclosure has been made keeping in mind the above problems occurring in the related art, and an objective of the present disclosure is to provide a rehabilitation exercise device for upper and lower limbs, the rehabilitation exercise device being capable of: enabling a user to perform a rehabilitation exercise by simply adjusting a mounting angle of his/her upper or lower limb in response to the condition of a rehabilitation patient; being simplified in structure, thereby minimizing the cost of purchase and installation; being convenient to move, thereby enabling the elderly or rehabilitation patients with weak muscles to easily move and place the device on a desk, chair, mattress, etc., and then to easily place their upper limb or lower limb on the device; and enabling the user to perform a rehabilitation exercise of each joint of his/her upper limb or lower limb to resemble normal motion.

In order to achieve the above objective, according to one aspect of the present disclosure, there is provided a rehabilitation exercise device for upper and lower limbs, the rehabilitation exercise device including: a first support supporting a user's hand or foot; a second support supporting a user's forearm or calf; a pair of first hinges rotatably connecting the first support and the second support to each other; a third support supporting a user's upper arm or thigh; a pair of second hinges rotatably connecting the second support and the third support to each other; and a distance adjustment part configured to adjust a distance between the first support and the third support by adjusting length of the second support.

Here, the second support comprises: a first fixing plate connected to the pair of first hinges to be rotatably coupled to the first support; a second fixing plate connected to the pair of second hinges to be rotatably coupled to the third support, and configured to be mutually approached or spaced apart with respect to the first fixing plate by the distance adjustment part; a hinge shaft provided between the first fixing plate and the second fixing plate; a first moving plate provided between the first fixing plate and the hinge shaft, and configured to be reciprocally moved therebetween; and a second moving plate provided between the second fixing plate and the hinge shaft, and configured to be reciprocally moved therebetween.

Furthermore, the distance adjustment part comprises: a first crank rotatably connected to the first fixing plate and the hinge shaft, and configured to convert a rotary motion of the hinge shaft into a linear motion of the first fixing plate; and a second crank rotatably connected to the second fixing plate and the hinge shaft, and is configured to convert the rotary motion of the hinge shaft into a linear motion of the second fixing plate.

Furthermore, the first crank comprises: a first adjustment link rotatably coupled to the hinge shaft; and a second adjustment link having a first side rotatably coupled to the first adjustment link, and a second side rotatably coupled to the first fixing plate, and the second crank comprises: a third adjustment link rotatably coupled to the hinge shaft; and a fourth adjustment link having a first side rotatably coupled to the third adjustment link, and a second side rotatably coupled to the second fixing plate.

Furthermore, the first crank further comprises a first connection link rotatably coupled to the first moving plate and the first adjustment link; and the second crank further comprises a second connection link rotatably coupled to the second moving plate and the third adjustment link.

Furthermore, the rehabilitation exercise device further comprises a connection bar connecting the first fixing plate and the second fixing plate to each other. Here, any one of the first fixing plate and the second fixing plate is fixed to the connection bar, and a remaining one of the first fixing plate and the second fixing plate is coupled to the connection bar to be movable therealong.

Furthermore, the rehabilitation exercise device further comprises a length stopper provided on the connection bar, and configured to limit relative movement of the first fixing plate and the second fixing plate.

Furthermore, the length stopper comprises: a restraining lever rotatably provided on any one of the first fixing plate and the second fixing plate coupled to be movable along the connection bar; and a pressurizing member provided on a rotational trajectory of the restraining lever, and configured to pressurize or release the connection bar by being approached to or spaced apart from the connection bar in response to rotation of the restraining lever.

Furthermore, the restraining lever comprises: a pusher provided at a first end thereof, and configured to pressurize or release the pressurizing member; and a knob provided at a second end thereof, and configured to rotate the pusher to allow the pusher to pressurize or release the pressurizing member.

Furthermore, the rehabilitation exercise device further comprises a rotation stopper provided on the hinge shaft, and configured to limit relative movement of the first fixing plate and the second fixing plate.

Furthermore, the rotation stopper comprises: a restraining dial; a shaft body forming the hinge shaft; a shaft column protruding upward from the shaft body and to which the restraining dial is coupled so as to be rotatable and liftable; and a shaft plate configured to be rotated around the shaft body, and connected to the first adjustment link and the third adjustment link. Here, a plurality of restraining holes are formed in the shaft body at a predetermined interval along a circumferential direction of the shaft column; the restraining dial comprises a restraining pin protruding from an end thereof oriented toward the shaft body and configured to be inserted into or released from any one selected from among the plurality of restraining holes, and a catching recess depressed in a region of the end of the restraining dial oriented toward the shaft body, at a position spaced apart from the restraining pin; and the shaft plate comprises a catching protrusion configured to connect the restraining dial to the shaft plate by being caught by the catching recess of the restraining dial.

Furthermore, when the restraining pin is inserted into the restraining hole, the catching protrusion is caught by the catching recess to prevent the restraining dial from being rotated around the shaft column; and when the restraining pin is released from the restraining hole, the catching protrusion is maintained caught by the catching recess, allowing the restraining dial to be rotatable forward and backward around the shaft column, so that the first fixing plate and the second fixing plate are mutually approached or spaced apart with respect to the shaft body.

Furthermore, the rehabilitation exercise device further comprises an elastic member provided between the shaft column and the restraining dial, and configured to generate an elastic force acting on the restraining dial so that the restraining pin is inserted into the selected restraining hole.

Furthermore, the rehabilitation exercise device further comprises a first guide rod extending in length from the first fixing plate toward the first moving plate, and configured to guide reciprocating movement of the first moving plate; and a second guide rod extending in length from the second fixing plate toward the second moving plate, and configured to guide reciprocating movement of the second moving plate.

Furthermore, the rehabilitation exercise device further comprises a pair of third guide rods extending in length from the hinge shaft toward the first moving plate the second moving plate, respectively, and configured to guide reciprocating movement of the first moving plate the second moving plate.

According to the present disclosure, the rehabilitation exercise device for upper and lower limbs, the rehabilitation exercise device being capable of: enabling a user to perform a rehabilitation exercise by simply adjusting a mounting angle of his/her upper or lower limb in response to the condition of a rehabilitation patient; being simplified in structure, thereby minimizing the cost of purchase and installation; being convenient to move, thereby enabling the elderly or rehabilitation patients with weak muscles to easily move and place the device on a desk, chair, mattress, etc., and then to easily place their upper limb or lower limb on the device; and enabling the user to perform a rehabilitation exercise of each joint of his/her upper limb or lower limb to resemble normal motion.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a rehabilitation exercise device for upper and lower limbs according to an embodiment of the present disclosure;

FIG. 2 is a view illustrating a state in which a base plate illustrated in FIG. 1 is tilted from a mounting plate;

FIG. 3 is a view illustrating a state of rehabilitating an upper limb using the rehabilitation exercise device according to the embodiment of the present disclosure;

FIG. 4 is a view illustrating a state of rehabilitating a lower limb using the rehabilitation exercise device according to the embodiment of the present disclosure;

FIG. 5 is a perspective view illustrating a rehabilitation exercise unit illustrated in FIG. 1;

FIGS. 6A and 6B are plan views of FIG. 5 illustrating a length adjustment process of a second support according to the present disclosure;

FIG. 7 is a view illustrating the mechanism for operating the second support illustrated in FIGS. 6A and 6B;

FIG. 8 is a main part enlarged sectional view illustrating a length stopper illustrated in FIGS. 6A and 6B;

FIG. 9 is a view illustrating another embodiment of a length adjustment process of a second support according to the present disclosure;

FIG. 10 is a main part enlarged perspective view illustrating a rotation stopper illustrated in FIG. 9;

FIG. 11 is a perspective view illustrating a restraining dial illustrated in FIG. 10;

FIG. 12 is a main part enlarged sectional view of FIG. 9;

FIG. 13 is a main part enlarged perspective view illustrating a state in which the mounting plate illustrated in FIG. 1 is erected at a predetermined angle with respect to the base plate;

FIG. 14 is a view illustrating the mechanism for operating the mounting plate illustrated in FIG. 13;

FIG. 15 is a main part enlarged view of FIG. 13;

FIG. 16 is a view illustrating the mechanism for operating a fixing unit in the base plate;

FIG. 17 is a main part bottom perspective view of FIG. 1;

FIGS. 18A and 18B are bottom views of FIG. 17 illustrating a process of adjusting an angle between a second support and a third support according to the present disclosure;

FIGS. 19A and 19B are views illustrating an angle adjustment state between the second support and the third support according to the present disclosure;

FIG. 20 is a view illustrating an arrangement state of an angle fixing lever and a rotary plate according to the present disclosure;

FIG. 21A is a perspective view illustrating a drive module according to the present disclosure;

FIG. 21B is a main part enlarged view of the drive module;

FIG. 22 is a perspective view illustrating a right second hinge according to the present disclosure;

FIG. 23 is a view illustrating a state that the drive module is attached to the right second hinge according to the present disclosure;

FIG. 24A is an exploded perspective view illustrating a drive shaft and a hinge shaft according to the present disclosure;

FIG. 24B is a view illustrating the mechanism for operating the drive shaft and the hinge shaft;

FIG. 25 is a view illustrating the mechanism for operating a rotary gear plate and a gear restraining member at a first hinge;

FIG. 26 is a view illustrating the tagging mechanism between the drive module and each hinges; and FIGS. 27 to 28 are views illustrating a fixing unit according to another embodiment of the present disclosure.

DETAILED DESCRIPTION OF THE INVENTION

The present disclosure relates to a rehabilitation exercise device for upper and lower limbs. The rehabilitation exercise device is characterized by including: a first support supporting a user's hand or foot; a second support supporting a user's forearm or calf; a pair of first hinges rotatably coupling the first support and the second support to each other; a third support supporting a user's upper arm or thigh; a pair of second hinges configured to be rotated in conjunction with the third support, and to which the second support part is coupled to be rotatable relative thereto; and an angle adjustment part adjusting an angle between the second support and the third support.

The above and other objectives, features, and advantages of the present disclosure will be more clearly understood from the following detailed description when taken in conjunction with the accompanying drawings. However, it should be understood that the various changes to the following embodiments are possible and the scope of the present disclosure is not limited to the following embodiments. The embodiments of the present disclosure are provided for allowing those skilled in the art to more clearly comprehend the present disclosure, and the scope of the present disclosure should be defined by the appended claims.

Terms used in this specification are selected to describe embodiments and thus should not be construed as the limit of the present disclosure. An element expressed in a singular form in this specification may be plural elements unless it is necessarily singular in the context. The terms "comprise" and/or "comprising" when used in this specification, specify the presence of stated features, but do not preclude the presence or addition of one or more other features. The same reference numerals are used throughout the different drawings to designate the same or similar components. The expression "and/or" is interpreted to include each of enumerated items, and all combinations including one or more items selected from among the enumerated items. Although the terms "first", "second", etc. may be used herein to describe various elements, these elements should not be limited by these terms. These terms are only used to distinguish one element from another element. For example, a first element discussed below could be termed a second element without departing from the scope of the present disclosure.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present disclosure will be described in detail with reference to the accompanying drawings.

FIGS. 1 to 25 illustrate a rehabilitation exercise device 1 for upper and lower limbs according to an embodiment of the present disclosure.

As illustrated in these drawings, the rehabilitation exercise device 1 according to the embodiment of the present disclosure includes a rehabilitation exercise unit 3 and a holder 5 for supporting the rehabilitation exercise unit 3.

The rehabilitation exercise unit 3 may include: a first support 310 for supporting a user's hand or foot; a second support 320 for supporting a user's forearm or calf; a pair of first hinges 311 and 312 for rotatably connecting the first support 310 and the second support 320 to each other; a third support 330 for supporting a user's upper arm or thigh; and a pair of second hinges 331 and 332 for rotatably connecting the second support 320 and the third support 330 to each other.

The holder 5 includes a base plate 510, and a mounting plate 520 on which the rehabilitation exercise unit 3 is mounted. The base plate 510 and the mounting plate 520 adopt a link-mechanism that converts horizontal motion into vertical motion. The link-mechanism is such that a first side of the mounting plate 520 is installed on the base plate 510 to be horizontally movable along a plate surface thereof, an intermediate region of the mounting plate 520 is connected to a first side of a link member 530, and a second side of the link member 530 is rotatably installed on the base plate 510.

According to the above configuration, as illustrated in FIG. 1, in a state in which the mounting plate 520 is folded to the base plate 510, as illustrated in FIG. 3, upper limb rehabilitation exercise is performed. On the other hand, as illustrated in FIG. 2, in a state in which the mounting plate 520 is erected at a certain angle from the base plate 510 by the link mechanism, as illustrated in FIG. 4, lower limb rehabilitation exercise is performed.

Here, angle adjustment between the mounting plate 520 and the base plate 510, and angle fixing and releasing will be described later.

The rehabilitation exercise unit 3 according to the present disclosure includes a distance adjustment part for adjusting the distance between the first support 310 and the third support 330 by adjusting the length of the second support 320 according to application in an upper or lower limb, and the length of a rehabilitation patient's upper or lower limb.

The distance adjustment part of the rehabilitation exercise unit 3 according to the present disclosure will be described with reference to FIGS. 5 to 8.

The rehabilitation exercise unit 3 according to the present disclosure, as an example, adopts a stacked slide-crank structure to the second support 320 so that the length of the second support 320 supporting the forearm or the calf is adjusted.

The second support 320 may include a first fixing plate 322, a second fixing plate 323, a first moving plate 324, a second moving plate 325, and a hinge shaft 321.

The first fixing plate 322 is connected to the pair of first hinges 311 and 312 to be rotatably coupled to the first support 310. The second fixing plate 323 is connected to the pair of second hinges 331 and 332 to be rotatably coupled to the third support 330.

The first moving plate 324 is provided between the first fixing plate 322 and the hinge shaft 321 and is movable reciprocally therebetween.

The second moving plate 325 is provided between the second fixing plate 323 and the hinge shaft 321 and is movable reciprocally therebetween.

The hinge shaft 321 is provided between the first fixing plate 322 and the second fixing plate 323.

Meanwhile, the distance adjustment part includes a first crank 326 and a second crank 327.

The first crank 326 is rotatably connected to the first fixing plate 322 and the hinge shaft 321 to convert a rotary motion of the hinge shaft 321 into a linear motion of the first fixing plate 322.

The first crank 326 includes a first adjustment link 326*a*, a second adjustment link 326*b*, and a first connection link 326*c*.

The first adjustment link 326*a* is rotatably coupled to the hinge shaft 321.

The second adjustment link 326*b* has a first side rotatably coupled to the first adjustment link 326*a*, and a second side rotatably coupled to the first fixing plate 322.

The first connection link 326*c* is rotatably coupled to the first moving plate 324 and an intermediate region of the first adjustment link 326*a*.

The second crank 327 is rotatably connected to the second fixing plate 323 and the hinge shaft 321 to convert a rotary motion of the hinge shaft 321 into a linear motion of the second fixing plate 323.

The second crank 327 includes a third adjustment link 327*a*, a fourth adjustment link 327*b*, and a second connection link 327*c*.

The third adjustment link 327*a* is rotatably coupled to the hinge shaft 321. The third adjustment link 327*a* is disposed opposite to the first adjustment link 326*a* at an angle of 180 degrees.

The fourth adjustment link 327*b* has a first side rotatably coupled to the third adjustment link 327*a*, and a second side rotatably coupled to the second fixing plate 323. The fourth adjustment link 327*b* is disposed opposite to the second adjustment link 326*b*.

The second connection link 327*c* is rotatably coupled to the second moving plate 325 and an intermediate region of the third adjustment link 327*a*. The second connection link 327*c* is disposed opposite to the first connection link 326*c*.

Meanwhile, reciprocating movement of the first moving plate 324 is guided by a pair of first guide rods 329*a* extending in length from the first fixing plate 322 toward the first moving plate 324. In addition, reciprocating movement of the first moving plate 324 is guided by a pair of third guide rods 329*c* extending in length from the hinge shaft 321 toward the first moving plate 324. Here, in this embodiment, it is illustrated that the first guide rods 329*a* and the third guide rods 329*c* are provided in pairs, respectively, but the present disclosure is not limited thereto. For example, at least one first guide rod 329*a* and at least one third guide rod 329*c* may be provided.

In addition, reciprocating movement of the second moving plate 325 is guided by a pair of second guide rods 329*b* extending in length from the second fixing plate 323 toward the second moving plate 325. In addition, reciprocating movement of the second moving plate 325 is guided by a pair of third guide rods 329*c* extending in length from the hinge shaft 321 toward the second moving plate 325. Here, in this embodiment, it is illustrated that the second guide rods 329*b* and the third guide rods 329*c* are provided in pairs, respectively, but the present disclosure is not limited thereto. For example, at least one second guide rod 329*b* and at least one third guide rod 329*c* may be provided.

According to the configuration as described above, in the distance adjustment part of the rehabilitation exercise device 1 according to the present disclosure, as illustrated in FIG. 7, by implementing the slide-crank mechanism in which the first fixing plate 322 and the first moving plate 324, and the second fixing plate 323 and the second moving plate 325 are operated in conjunction with each other, respectively, so as to be mutually approached or spaced apart with respect to the hinge shaft 321, it is possible to adjust the length of the second support 320, thereby adjusting the distance between the first support 310 and the third support 330.

Hereinafter, in order to help the understanding of the present disclosure, the adjustment of the length of the second support 320 will be described in detail with reference to FIG. 7.

In FIG. 7, when the first adjustment link 326*a* and the second adjustment link 326*b* are pivoted clockwise around the hinge shaft 321, the angle between the first adjustment link 326*a* and the second adjustment link 326*b* and the angle between the first adjustment link 326*a* and the first connection link 326*c* increase, so that the distance between the hinge shaft 321 and the first fixing plate 322 is increased. Similarly, the angle between the third adjustment link 327*a* and the fourth adjustment link 327*b*, and the angle between the third adjustment link 327*a* and the second connection link 327*c* increase to the same angle as that between the first adjustment link 326*a* and the second adjustment link 326*b*, so that the distance between the hinge shaft 321 and the second fixing plate 323 is increased. Consequently, the first fixing plate 322 and the second fixing plate 323 are spaced apart from each other by equal distances from the hinge shaft 321.

On the contrary, in FIG. 7, when the first adjustment link 326*a* and the second adjustment link 326*b* are pivoted counterclockwise around the hinge shaft 321, the angle between the first adjustment link 326*a* and the second adjustment link 326*b* and the angle between the first adjustment link 326*a* and the first connection link 326*c* decrease, so that the distance between the hinge shaft 321 and the first fixing plate 322 is decreased. Similarly, the angle between the third adjustment link 327*a* and the fourth adjustment link 327*b*, and the angle between the third adjustment link 327*a* and the second connection link 327*c* decreased to the same angle as that between the first adjustment link 326*a* and the second adjustment link 326*b*, so that the distance between the hinge shaft 321 and the second fixing plate 323 is decreased. Consequently, the first fixing plate 322 and the second fixing plate 323 are approached to each other by equal distances from the hinge shaft 321.

Therefore, in the rehabilitation exercise device 1 according to the present disclosure, the first fixing plate 322 and the first moving plate 324, and the second fixing plate 323 and the second moving plate 325 are operated in conjunction with each other, respectively, so as to be mutually approached or spaced apart with respect to the hinge shaft 321.

Meanwhile, the first fixing plate 322 and the second fixing plate 323 are connected to each other by a pair of connection bars 328.

In the present disclosure, a side of each of the connection bars 328 is fixed to the second fixing plate 323, and the first fixing plate 322 is movably coupled to the connection bars 328, so that the first fixing plate 322 is approached to and spaced apart from the second fixing plate 323.

A through-hole 322*a* (see FIG. 8) for allowing passage of each of the connection bars 328 therethrough may be formed in the first fixing plate 322, so that longitudinal movement of the first fixing plate 322 may be guided along the connection bar 238.

In addition, a length stopper 340 may be installed on the first fixing plate 322 to restrain the longitudinal movement of the first fixing plate 322, for example, to limit relative movement of the first fixing plate 322 and the second fixing plate 323. In the present disclosure, as an example, a pair of length stoppers 340 are installed on the pair of connection bars 328, respectively.

FIG. 8 is a sectional view illustrating the region of the length stopper 340 according to the present disclosure. Referring to FIG. 8, the length stopper 340 may include a restraining lever 341 and a pressurizing member 345.

The restraining lever 341 is rotatably installed on a rotary shaft 322*b* coupled to the first fixing plate 322.

The restraining lever 341 includes a pusher 342 provided at a first end thereof to pressurize or release the pressurizing member 345, and a knob 343 provided at a second end thereof to rotate the pusher 342 to allow the pusher 342 to pressurize or release the pressurizing member 345.

The pusher 342 has a semicircular arc shape having a predetermined radius of curvature, and is configured to be brought into contact with and spaced apart from the pressurizing member 345 by rotation.

Therefore, in FIG. 8, when the restraining lever 341 is rotated clockwise around the rotary shaft 322*b*, the pusher 342 is rotated toward the pressurizing member 345 to be brought into contact with the pressurizing member 345 and to pressurize the pressurizing member 345, and the pressurizing member 345 pressurizes the connection bar 328 passing through the through-hole 322*a* to prevent the first fixing plate 322 from moving in the longitudinal direction. On the other hand, when the restraining lever 341 is rotated counterclockwise around the rotary shaft 322*b*, the pusher 342 is spaced from the pressurizing member 345 and releases the pressurizing member 345, so that the connection bar 238 is allowed to be moved inside the through-hole 322*a*, thereby allowing the movement of the first fixing plate 322 in the longitudinal direction along the connection bar 328.

Here, in this embodiment, it is illustrated that a side of the connection bar 328 is fixed to the second fixing plate 323, and the first fixing plate 322 is movably coupled to the connection bar 328, but the present disclosure is not limited thereto. For example, the side of the connection bar 328 may be fixed to the first fixing plate 322, and the second fixing plate 323 may be movably coupled to the connection bar 328. In this case, the restraining lever 341 is provided on the second fixing plate 323.

FIGS. 9 to 12 are views illustrating an example of a structure for restraining longitudinal movement of a second support 320 according to another embodiment of the present disclosure. A rehabilitation exercise unit 3 according to the other embodiment of the present disclosure may include a rotation stopper 350 provided on a hinge shaft 321 to limit relative movement of a first fixing plate 322 and a second fixing plate 323.

As described above, the second support 320 according to the present disclosure has a slide-crank structure in adjusting a longitudinal length thereof, which includes rotation of the hinge shaft 321. The rotation stopper 350 restrains the rotation of the hinge shaft 321 to maintain a predetermined length.

The rotation stopper 350 includes a restraining dial 351, a shaft body 353 for forming the hinge shaft 321, a shaft column 354 protruding upward from the shaft body 353, and a shaft plate 352 rotated around the shaft body 354 and connected to the first adjustment link 326*a* and the third adjustment link 327*a* to rotate the first adjustment link 326*a* and the third adjustment link 327*a* with respect to the shaft body 353.

The restraining dial 351 includes a restraining pin 351*a* and a catching recess 351*c*.

The restraining pin 351*c* is formed by protruding from an end of the restraining dial 351 oriented toward the shaft body 353, and is inserted into or released from any one selected from among a plurality of restraining holes 352*a* which will be described later.

The catching recess 351*c* is depressed in a region of the end of the restraining dial 351 oriented toward the shaft body 353, at a position spaced from the restraining pin 351*a*. In this embodiment, a pair of catching recesses 351*c* are provided opposite to each other.

The plurality of restraining holes 352*a* are formed in the shaft body 353 at a predetermined interval along the circumferential direction of the shaft column 354.

The shaft plate 352 has a circular ring shape. The shaft plate 352 is configured such that the first adjustment link 326*a* and the third adjustment link 327*a* are connected to an outer circumference thereof, and the restraining dial 351 is rotatably provided on an inner circumference thereof. In addition, the shaft plate 352 has a pair of catching protrusions 352*b* protruding from a region of the inner circumference thereof, and connecting the restraining dial 351 to the shaft plate 352 by being caught by the catching recesses 351*c* of the restraining dial 351.

In addition, the rotation stopper 350 according to the present disclosure may further include an elastic member 355.

The elastic member 355 is provided between the shaft column 354 and the restraining dial 351, and generates elastic force acting on the restraining dial 351 so that the restraining pin 351*a* is inserted into the selected restraining hole 352*a*.

When a user wants to adjust the length of the second support 320, the user adjusts the length by pulling the restraining dial 351 upward so that the restraining dial 351 ascends from the shaft body 353 to a position where the restraining pin 351*a* is separated from the restraining hole 352*a*. Then, when the second support 320 is adjusted to a desired length, the user releases the restraining dial 351 so that the restraining dial 351 descends toward the shaft body 353 by the elastic force of the elastic member 355, and at the same time, the restraining pin 351*a* is inserted into the restraining hole 352*a* at a corresponding position.

With this configuration, in the rotation stopper 350 according to the present disclosure, when the restraining pin 351*a* is inserted into the restraining hole 352*a*, the shaft plate 352 is not rotated with respect to the shaft body 353, so that the length of the second support 320 is not allowed to be adjusted. At the same time, the catching protrusions 352*b* of the shaft plate 352 are caught by the catching recesses 351*c* of the restraining dial 351, so that the restraining dial 351 is prevented from being rotated around the shaft column 354.

On the other hand, in the rotation stopper 350 according to the present disclosure, when the dial pin 351*a* is released from the restraining hole 352*a*, the shaft plate 352 is rotated with respect to the shaft body 353, so that the length of the second support 320 is allowed to be adjusted. At this time, the catching protrusions 352*b* of the shaft plate 352 are maintained caught by the catching recesses 351*c* of the restraining dial 351, so that the restraining dial 351 is maintained in a state connected to the shaft plate 352. Thus, the restraining dial 351 is allowed to be rotatable forward and backward around the shaft column 354, so that the first fixing plate 322 and the second fixing plate 323 are mutually approached or spaced apart with respect to the shaft body 353, thereby adjusting the length of the second support 320.

In FIG. 11, reference numeral 351*b* denotes a pin insertion portion into which the restraining pin 351*a* is inserted and fixed, and reference numeral 351*d* denotes a shaft through-hole through which the shaft column 354 passes and fixed. For convenience of explanation, FIG. 10 illustrates a state in which the restraining pin 351*a* is inserted in the restraining hole 352*a* in a state of being released from the restraining dial 351.

As such, by implementing a slide-crank mechanism in which the first fixing plate 322 and a first moving plate 324, and the second fixing plate 323 and a second moving plate 325 are operated in conjunction with each other, respectively, so as to be mutually approached or spaced apart with respect to the hinge shaft 321, it is possible to adjust the length of the second support 320, thereby adjusting the distance between the first support 310 and the third support 330 in response to various lengths of the forearm or calf of the user during rehabilitation.

Hereinafter, the configuration of the holder 5 according to the present disclosure will be described in detail with reference to FIGS. 13 to 16.

As described above, the holder 5 may include the base plate 510, the mounting plate 520, and the link member 530. According to this configuration, a link mechanism as illustrated in FIG. 14 is implemented.

As described above, the opposite sides of the link member 530 are rotatably coupled to the base plate 510 and the mounting plate 520, respectively. Here, the first side (i.e., in the direction of the first support 510) of the mounting plate 520 is coupled to the base plate 510 to be horizontally movable along the plate surface thereof, and the first side of the link member 530 is rotatably coupled to the intermediate region of the mounting plate 520. In addition, a second side of the mounting plate 520 is approached to and spaced apart from the base plate 510 in the vertical direction by the link mechanism, so that angle adjustment is implemented as illustrated in FIGS. 1 and 2.

The second side of the link member 530 is rotatably coupled to a fixing shaft 531 provided on the base plate 510, so that when the first side of the mounting plate 520 moves in the horizontal direction, the angle of the mounting plate 520 is adjusted by rotation of the opposite sides of the link member 530.

Meanwhile, a pair of extension brackets 521 are installed opposite at the first side of the mounting plate 520 by extending parallel toward the third support 330. First ends of the pair of extension brackets 521, for example, first ends thereof oriented toward the first support 310, are rotatably coupled to the mounting plate 520. Second ends of the pair of extension brackets 521, for example, second ends thereof oriented toward the third support 330, are connected to each other by a connection rod 522.

In addition, a catching plate 511 is installed inside the base plate 510, with a plurality of catching protrusions 512 formed thereon along the longitudinal direction and allowing the connection rod 522 to be caught thereby in response to the angle between the mounting plate 520 and the base plate 510. The plurality of catching protrusions 512 are formed at a predetermined interval along the longitudinal direction of the pair of extension brackets 521, so that the connection rod 522 is selectively caught by the catching protrusions 512. Thus, in response to an inclination angle between the mounting plate 520 and the base plate 510, the connection rod 522 is caught by any one of the catching protrusions 512, so that the inclination angle is maintained at a predetermined angle.

In addition, the holder 5 according to the present disclosure may include a fixing unit 540 for fixing the connection rod 522 to maintain the connection rod 522 caught by any one of the catching protrusions 512.

The fixing unit 540 may include a pair of unit bodies 541, a pair of operating levers 542, a pair of interlocking levers 543, and a pair of interlocking brackets 522*a*, as shown in FIGS. 15 and 16.

The unit bodies 541 are reciprocally moved along the base plate 510 in conjunction with the connection rod 522 in response to adjustment of the angle between the base plate 510 and the mounting plate 520.

The operating levers 542 are provided outside the base plate 510, and are rotatably coupled to the unit bodies 541.

The interlocking levers 543 are provided inside the base plate 510, and are rotatably coupled to the unit bodies 541 so as to be rotated in conjunction with rotation of the operating levers 542.

The interlocking brackets 522*a* are provided on opposite edges of the connection rod 522 to be oriented toward the interlocking levers 543, and are pressurized or released in response to rotation of the interlocking levers 543. The interlocking brackets 522*a* are connected to the connection rod 522 by connecting brackets 522*b*.

With this configuration, as illustrated in FIG. 16A, when the operating levers 542 are rotated clockwise, the interlocking levers 543 are rotated clockwise, so that the connecting brackets 522*b* are pressurized downward by the interlocking levers 543. Therefore, the connection rod 522 is limited from being moved upward, and thus the connection rod 522 is prevented from being released from the catching protrusion 512 of the base plate 510.

On the other hand, in performing an operation of folding or unfolding the mounting plate 520 to adjust the angle of the mounting plate 520 with respect to the base plate 510, as illustrated in FIGS. 16B and 16C, when the operating levers 542 are rotated counterclockwise, the interlocking levers 543 are rotated counterclockwise to allow lifting of upper ends of the interlocking brackets 522*a*, so that the connection rod 522 is released from the catching protrusion 512, allowing the mounting plate 520 to be folded or unfolded.

Therefore, by removing or fixing the connection rod 522 from or into the catching protrusion 512 through the operation of the operating levers 542 outside the base plate 510, a safety accident that may occur due to an operation of lifting the connection rod 522 by inserting a hand between the mounting plate 520 and the base plate 510 is prevented from occurring.

In addition, by releasing the connection rod 522 from the catching protrusion 512, as illustrated in FIG. 3, in a state in which the mounting plate 520 is folded to the base plate 510, upper limb rehabilitation exercise is performed. In addition, by fixing the connection rod 522 to the catching protrusion 512, as illustrated in FIG. 4, in a state in which the mounting plate 520 is erected from the base plate 510 at a predetermined angle, lower limb rehabilitation exercise is performed.

In addition, in response to the condition of the rehabilitation patient, rehabilitation exercise is performed by simply adjusting a mounting angle of the upper or lower limb with respect to the base plate 510 seated on the floor.

Meanwhile, FIGS. 27 and 28 illustrate a fixing unit 540*a* having a different shape from the fixing unit 540 described above.

Unlike the above-described fixing units 540, in the fixing unit 540*a* according to another embodiment of the present disclosure, a plurality of auxiliary catching protrusions 523 are formed on a side of the base plate 510 along the longitudinal direction of the base plate 510, for example, in a parallel relationship to the plurality of catching protrusions 512.

The plurality of auxiliary catching protrusions 523 have a continuous wave shape with valleys and ridges, and are arranged at the same pitch as the plurality of catching protrusions 512. A unit body 541 is selectively mounted on the plurality of auxiliary catching protrusions 523.

In addition, on the side of the base plate 510 where the plurality of auxiliary catching protrusions 523 are formed, a plurality of catching pins 524 are provided at positions corresponding to the valleys of the auxiliary catching protrusions 523.

The plurality of catching pins 1524 are arranged at the same pitch as the auxiliary catching protrusions 523, and protrude from the side of the base plate 510.

In addition, in the fixing unit 540*a* according to another embodiment of the present disclosure, an interlocking lever 543*a* rotated in conjunction with rotation of an operating lever 542 has a ring-shaped free end.

The interlocking lever 543*a* is provided outside the base plate 510, and is rotatably coupled to the unit body 541.

As the interlocking lever 543*a* is rotated in conjunction with rotation of the operating lever 542, the interlocking lever 543*a* is caught by or released from a selected catching pin 524.

In addition, the unit body 541 is connected to the connection rod 522 by a connecting bracket 522*b*.

With this configuration, as illustrated in FIGS. 27 and 28, in a state in which the connection rod 522 is caught by the catching protrusion 512, the operating lever 542 is located perpendicular to the base plate 510. At this time, since the interlocking lever 543*a* is caught by the catching pin 524, the connection rod 522 is limited from being moved upward, and thus the connection rod 522 is prevented from being released from the catching protrusion 512 of the base plate 510.

On the other hand, in performing an operation of folding or unfolding the mounting plate 520 to adjust the angle of the mounting plate 520 with respect to the base plate 510, when the operating lever 542 is rotated counterclockwise, the interlocking lever 543*a* is rotated counterclockwise and released from the catching pin 524 to allow lifting of operating lever 542, so that the connection rod 522 is released from the catching protrusion 512, allowing the mounting plate 520 to be folded or unfolded.

Therefore, by removing or fixing the connection rod 522 from or into the catching protrusion 512 through the operation of the operating lever 542 outside the base plate 510, in response to the condition of the rehabilitation patient, rehabilitation exercise is performed by simply adjusting the mounting angle of the upper or lower limb with respect to the base plate 510 seated on the floor.

Meanwhile, in the rehabilitation exercise device 1 according to the present disclosure, the drive module 7 may be selectively couple to any one of the pair of first hinges 311 and 312 and the pair of second hinges 331 and 332. For example, in the case of the upper limb, when the drive module 7 is mounted on any one of the first hinges 311 and 312, wrist rehabilitation exercise is possible. On the other hand, when the drive module 7 is mounted on any one of the second hinges 331 and 332, elbow joint rehabilitation exercise is possible.

At this time, in the case of the pair of first hinges 311 and 312, a mounting position of the drive module 7 may be determined according to rehabilitation of a left or right upper limb. Similarly, in the case of the pair of second hinges 331 and 332, the drive module 7 may be selectively mounted according to rehabilitation of a right or left upper limb.

Herein, when the wrist motion is performed in the state that the drive module 7 is couple to the first hinge 311 or 312, that is, when the first support 310 and the second support 320 are relatively rotated to each other, the second support 320 and the third support 330 need to be maintained fixed angle.

In addition, as illustrated in FIGS. 17 to 20, the rehabilitation exercise device 1 according to the present disclosure may include an angle adjustment part 6 for adjusting an angle between the second support 320 and the third support 330.

The angle adjustment part 6 includes a pair of rotary plates 611, a plurality of fixing holes 613, an angle fixing lever 621, a pair of first transmission links 623, and a pair of second transmission links 625.

The pair of rotary plates 611 have a disc shape, are provided integrally with the third support 330 so as to be rotated independently of the pair of second hinges 331 and 332, and are shafted to the pair of second hinges 331 and 332. Therefore, the second hinges 331 and 332 of the rehabilitation exercise device 1 according to the present disclosure are rotated independently of the third support 330, and the second support 320 is coupled to the second hinges 331 and 332 to be rotatable relative thereto. The second hinges 331 and 332 are fixed to the mounting plate 520.

The plurality of fixing holes 613 are formed at a predetermined interval along the circumferential direction of each of the rotary plates 611. The plurality of fixing holes 613 are inclined at a predetermined angle with respect to the radial direction of the rotary plate 611 in consideration of the radius of rotation of the second transmission links 625 rotated in response to the operation of the angle fixing lever 621 which will be described later.

The angle fixing lever 621 is provided between the pair of second hinges 331 and 332, and is reciprocally moved relative to the first support 310. As illustrated in FIG. 17, the angle fixing lever 621 is located under the third support 330.

The pair of first transmission links 623 are rotatably coupled to opposite sides of the angle fixing lever 621, respectively.

A first side of each of the pair of second transmission links 625 is rotatably coupled to an associated one of the pair of first transmission links 623, and a second side of each of the pair of second transmission links 625 is selectively inserted into or released from a selected fixing hole 613, so that rotation of the pair of rotary plates 611 are restrained or released.

With this configuration, when the angle fixing lever 621 is moved in a direction opposite to the first support 310, as illustrated in FIG. 18B, the respective second sides of the second transmission links 625 are rotated inward of the second hinges 331 and 332 and released from the respective selected fixing holes 613, so that the angle between the second support 320 and the third support 330 is released.

On the other hand, when the angle fixing lever 621 is moved in a direction toward the first support 310, as illustrated in FIG. 18A, the second sides of the second transmission links 625 are rotated outward of the second hinges 331 and 332 and inserted into the selected fixing holes 613, so that the angle between the second support 320 and the third support 330 is fixed.

Here, FIG. 18A illustrates a position where the angle is fixed, and FIG. 18B illustrates a position where the angle is released. An elastic member 627, such as a spring, may be provided on the angle fixing lever 621 to pressurize the angle fixing lever 621 to the position where the angle is fixed.

The elastic member 627 generates an elastic force acting on the angle fixing lever 621 so that the second transmission links 625 are inserted into the selected fixing holes 613.

Therefore, in a state in which the second support 320 and the third support 330 are horizontally fixed as illustrated in FIG. 19A, when the user pulls the angle fixing lever 621 in a direction opposite to the first support 310 to allow the second transmission links 625 to be released from the fixing holes 613, rotates the third support 330 at a desired angle with respect to the second support 320, and then releases the angle fixing lever 621, as the angle fixing lever 621 is moved toward the first support 310 by the elastic force of the elastic member 627, the second transmission links 625 are inserted into the selected fixing holes 613, so that as illustrated in FIG. 19B, the third support 330 is fixed at the desired angle with respect to the second support 320 at a corresponding position.

Meanwhile, the rotary plate 611 may have a first rotation guide hole 615 and a second rotation guide hole 617 formed in a semicircular arc shape along the circumferential direction. The first rotation guide hole 615 and the second rotation guide hole 617 may have semicircular arc shapes facing each other with the rotation center of each of the second hinges 331 and 332 interposed therebetween.

Here, a first rotation guide protrusion 331*a* and a second rotation guide protrusion 331*b* protruding from each of the second hinges 331 and 332 are inserted into and moved along the first rotation guide hole 615 and the second rotation guide hole 617, so that rotation between the second support 320 and the third support 330 is guided around the second hinges 331 and 332. At this time, the rotation angle between the second support 320 and the third support 330 may be restrained within a range of about 180 degrees by the semicircular arc-shaped first rotation guide hole 615 and second rotation guide hole 617.

As such, in response to various angles between the forearm and the upper arm or between the calf and the thigh according to the condition of the rehabilitation patient, rehabilitation is performed by adjusting the angle between the second support 320 and the third support 330.

Hereinafter, the drive module 7 according to the present disclosure will be described in detail with reference to FIGS. 21 to 24.

As described above, the drive module 7 is selectively mounted on any one of the pair of first hinges 311 and 312 and the pair of second hinges 331 and 332 to pivot the first support 310 or the second support 320.

The drive module 7 may include a body housing 710 in which components such as a drive motor, a printed circuit board, etc. are accommodated, a drive shaft 720 to which a rotary shaft of the drive motor is connected, and a ring member 730 for allowing mounting and fixing of the drive module 7 on the first hinges 311 and 312 or the second hinges 331 and 332.

In addition, a ring coupling portion 751 is formed on each of the first hinges 311 and 312 or each of the second hinges 331 and 332.

Meanwhile, in this embodiment, the drive module 7 is mounted on the second hinge 332 located on the right side as viewed from the first support 310 to the third support 330 in FIG. 1. Therefore, for convenience of explanation, the second hinge 332 located on the right side is hereinafter referred to as a right second hinge 332.

Here, a plurality of mounting protrusions 731 are formed on an inside of the ring member 730 at a predetermined interval along the circumferential direction of the ring member 730, and a ring coupling portion 751 to which the ring member 730 of the drive module 7 is coupled is provided circumferentially around an opening of the right second hinge 332. A plurality of catching portions 753 may be formed in the ring coupling portion 751 corresponding to the mounting protrusions 731.

Thus, when the drive module 7 is inserted into the right second hinge 332 and then the ring member 730 is rotated, the mounting protrusions 731 are rotated and caught by the catching portions 753, so that the drive module 7 is prevented from being released.

In addition, a catching lever 740 is provided on the body housing 710*a* to restrain rotation of the ring member 730 by being inserted into the ring member 730, so that after rotating the ring member 730, the catching lever 740 is pushed and inserted into the ring member 730 to thereby prevent rotation of the ring member 730.

In addition, the right second hinge 332 includes a hinge shaft 760*a* with which a drive shaft 720*a* of the drive module 7 is meshed.

As illustrated in FIGS. 33A and 33B, the drive shaft 720*a* and the hinge shaft 760*a* respectively include pluralities of jaws 720*b* and 760*b* that circumferentially alternately protrude to face each other.

The respective jaws 720*b* and 760*b* of the driving shaft 720*a* and the hinge shaft 760*a* are meshed with each other, so that a rotational force of the drive module 7 is transmitted to the right second hinge 322 through the hinge shaft 760*b*. Here, the hinge shaft 760*a* of the right second hinge 322 is connected to the second support 330.

In addition, any one of the drive shaft 720*a* and the hinge shaft 760*a* includes an elastic member 765*a*, such as a spring, for generating an elastic force acting on the remaining opposite one to be pressurized, so that the drive shaft 720*a* and the hinge shaft 760*a* are firmly connected to each other.

In addition, each of the jaws 720*b* and 760*b* of the drive shaft 720*a* and the hinge shaft 760*a* is configured such that opposite sides thereof are inclined, so that the drive shaft 720*a* and the hinge shaft 760*a* are easily coupled to each other even when slight misalignment occurs during initial coupling.

As such, the rehabilitation exercise device 1 according to the present disclosure allows the drive module 7 to be easily mounted on and removed from a desired hinge, thereby enabling the user to perform a rehabilitation exercise with improved convenience.

Meanwhile, as illustrated in FIGS. 25A and 25B, a rotation restraining part 770 may be provided to restrain rotation of the first hinges 311 and 312 or the second hinges 331 and 332.

In this embodiment, since the drive module 7 is mounted on the right second hinge 332, the rotation restraining part 770 is provided on each of the pair of first hinges 311 and 312.

The rotation restraining part 770 may include a rotary gear plate 771 rotated in conjunction with any one of the first support 310 and the second support 320, and a gear restraining member 775 installed on any one of the first support 310 and the second support 320.

The rotary gear plate 771 may have gear teeth circumferentially formed along an end thereof, and the gear restraining member 775 may also have gear teeth formed at an end thereof. Thus, rotation of the first support 310 and the second support 320 may be restrained such that when the gear restraining member 775 is meshed with the rotary gear plate 771 as illustrated in FIG. 25A, the rotary gear plate 771 is not rotated, and when the gear restraining member 775 is released from the rotary gear plate 771 as illustrated in FIG. 25B, the rotary gear plate 771 is rotated.

The above structure is applicable equally to the second hinges 331 and 332.

By this configuration, as illustrated in FIG. 1, When the drive module 7 is mounted on the right second hinge 332, and the gear restraining member 775 and the rotary gear plate 771 of each of the pair of first hinges 311 and 312 are meshed with each other so that the pair of first hinges 311 and 312 are not rotated, the second support 320 performs a pivoting motion by a rotational force of the drive module 7, whereas the first support 310 is limited in pivoting motion, so that the user can exercise an elbow joint while a wrist joint is not moved.

In another embodiment, when the drive module 7 is mounted on the right first hinge 312, and the gear restraining member 775 and the rotary gear plate 771 of each the pair of second hinges 331 and 332 are meshed with each other so that the pair of second hinges 331 and 332 are not rotated, the first support 310 performs a pivoting motion by a rotational force of the drive module 7, whereas the second support 320 is limited in pivoting motion, so that the user can exercise the wrist joint while the elbow joint is not moved.

As such, by enabling the user to distinguish which joint is not to be pivoted by the drive module 7 and then to operate the gear restraining member 775 and the rotary gear plate 771 of a corresponding hinge associated with the joint, the user can selectively perform wrist joint or elbow joint rehabilitation exercises.

Meanwhile, the rehabilitation exercise device 1 according to the embodiment of the present disclosure may enable the user to perform rehabilitation by selectively mounting the drive module 7 to each hinge in response to a position of the upper or lower limb to be exercised.

For example, when the drive module 7 is mounted on the left first hinge 311 or the left second hinge 331, the rehabilitation exercise device 1 according to the embodiment of the present disclosure is worn on a right upper limb to exercise, without causing interference of the drive module 7 with a user's torso. In this case, when the drive module 7 is mounted on the left first hinge 311, exercise of a right wrist joint is possible. On the other hand, when the drive module 7 is mounted on the left second hinge 331, exercise of a right elbow joint is possible.

When the drive module 7 is mounted on the right first hinge 312 or the right second hinge 332, the rehabilitation exercise device 1 according to the embodiment of the present disclosure is worn on a left upper limb to exercise, without causing interference of the drive module 7 with the user's torso. In this case, when the drive module 7 is mounted on the right first hinge 312, exercise of a left wrist joint is possible. On the other hand, when the drive module 7 is mounted on the right second hinge 332, exercise of a left elbow joint is possible.

In addition, as illustrated in FIGS. 26A and 26B, a tag 920 may be installed on each of the first hinges 311 and 312 and the second hinges 331 and 332 at a position where tagging is possible when the drive module 7 is coupled to the first hinges 311 and 312 or the second hinges 331 and 332. In addition, a reader 910 may be installed in the drive module 7, the reader being capable of tagging the tag 920 when the drive module 7 is coupled to the first hinges 311 and 312 or the second hinges 331 and 332. Here, the tag 920 and the reader 910 may communicate with each other through radio frequency (RF) communication or near field communication (NFC).

Thus, even when the drive module 7 is mounted on any one of the pair of first hinges 311 and 312 and the pair of second hinges 331 and 332, the position where the drive module 7 is mounted is automatically recognized through recognition of the tag 920.

This enables that when the rehabilitation exercise device 1 according to the present invention is operated in conjunction with a smart phone, which part of a user's body is to be exercised is automatically recognized by automatically recognizing the mounting position of the drive module 7, and a preset load, a preset amount of exercise, a preset number of exercises, etc. are transmitted to the drive module 7 through the smart phone. In the same manner, records of user exercises corresponding parts of the user's body are stored in the smart phone.

Although exemplary embodiments of the present disclosure have been described with reference to the accompanying drawings, those skilled in the art will appreciate that various modifications, additions and substitutions are possible, without departing from the scope and spirit of the disclosure as defined in the appended claims. Thus, the above-described exemplary embodiments are intended to be illustrative in all respects, rather than restrictive, of the present disclosure.

The present disclosure can find application in a rehabilitation exercise device for rehabilitation of a patient's upper or lower limb.

What is claimed is:

1. A rehabilitation exercise device for upper and lower limbs, the rehabilitation exercise device comprising:

a first support configured to support a user's hand or foot;

a second support configured to support the user's forearm or calf;

a pair of first hinges configured to rotatably connect the first support and the second support to each other;

a third support configured to support the user's upper arm or thigh;

a pair of second hinges configured to rotatably connect the second support and the third support to each other; and a distance adjustment part configured to adjust a distance between the first support and the third support by adjusting a length of the second support, wherein the second support comprises:

a first fixing plate connected to the pair of first hinges to be rotatably coupled to the first support;

a second fixing plate connected to the pair of second hinges to be rotatably coupled to the third support, and configured to be mutually approached or spaced apart with respect to the first fixing plate by the distance adjustment part;

a hinge shaft provided between the first fixing plate and the second fixing plate;

a first moving plate provided between the first fixing plate and the hinge shaft, and configured to be reciprocally moved therebetween; and a second moving plate provided between the second fixing plate and the hinge shaft, and configured to be reciprocally moved therebetween, and wherein the distance adjustment part comprises:

a first crank rotatably connected to the first fixing plate and the hinge shaft, and configured to convert a rotary motion of the hinge shaft into a linear motion of the first fixing plate; and a second crank rotatably connected to the second fixing plate and the hinge shaft, and is configured to convert the rotary motion of the hinge shaft into a linear motion of the second fixing plate.

2. The rehabilitation exercise device of claim 1, wherein the first crank comprises:

a first adjustment link rotatably coupled to the hinge shaft; and a second adjustment link having a first side rotatably coupled to the first adjustment link, and a second side rotatably coupled to the first fixing plate, and the second crank comprises:

a third adjustment link rotatably coupled to the hinge shaft; and a fourth adjustment link having a first side rotatably coupled to the third adjustment link, and a second side rotatably coupled to the second fixing plate.

3. The rehabilitation exercise device of claim 2, wherein the first crank further comprises a first connection link rotatably coupled to the first moving plate and the first adjustment link; and the second crank further comprises a second connection link rotatably coupled to the second moving plate and the third adjustment link.

4. The rehabilitation exercise device of claim 1, further comprising:

a connection bar connecting the first fixing plate and the second fixing plate to each other, wherein one of the first fixing plate and the second fixing plate is fixed to the connection bar, and a remaining one of the first fixing plate and the second fixing plate is coupled to the connection bar to be movable thereal-ong.

5. The rehabilitation exercise device of claim 4, further comprising:

a length stopper provided on the connection bar, and configured to limit relative movement of the first fixing plate and the second fixing plate.

6. The rehabilitation exercise device of claim 5, wherein the length stopper comprises:

a restraining lever rotatably provided on one of the first fixing plate and the second fixing plate coupled to be movable along the connection bar; and a pressurizing member provided on a rotational trajectory of the restraining lever, and configured to pressurize or release the connection bar by being approached to or spaced apart from the connection bar in response to rotation of the restraining lever.

7. The rehabilitation exercise device of claim 6, wherein the restraining lever comprises:

a pusher provided at a first end of the restraining lever, and configured to pressurize or release the pressurizing member; and a knob provided at a second end of the restraining lever, and configured to rotate the pusher to allow the pusher to pressurize or release the pressurizing member.

8. The rehabilitation exercise device of claim 2, further comprising:

a rotation stopper provided on the hinge shaft, and configured to limit relative movement of the first fixing plate and the second fixing plate.

9. The rehabilitation exercise device of claim 8, wherein the rotation stopper comprises:

a restraining dial;

a shaft body forming the hinge shaft;

a shaft column protruding upward from the shaft, the restraining dial coupled to the shaft column so as to be rotatable and liftable; and a shaft plate configured to be rotated around the shaft body, and connected to the first adjustment link and the third adjustment link, wherein a plurality of restraining holes are formed in the shaft body at a predetermined interval along a circumferential direction of the shaft column;

the restraining dial comprises a restraining pin protruding from an end thereof oriented toward the shaft body and configured to be inserted into or released from one restraining hole selected from the plurality of restraining holes, and a catching recess depressed in a region of the end of the restraining dial oriented toward the shaft body, at a position spaced apart from the restraining pin; and the shaft plate comprises a catching protrusion configured to connect the restraining dial to the shaft plate by being caught by the catching recess of the restraining dial.

10. The rehabilitation exercise device of claim 9, wherein when the restraining pin is inserted into the one restraining hole, the catching protrusion is caught by the catching recess to prevent the restraining dial from being rotated around the shaft column; and when the restraining pin is released from the one restraining hole, the catching protrusion is maintained caught by the catching recess, allowing the restraining dial to be rotatable forward and backward around the shaft column, so that the first fixing plate and the second fixing plate are mutually approached or spaced apart with respect to the shaft body.

11. The rehabilitation exercise device of claim 9, further comprising:

an elastic member provided between the shaft column and the restraining dial, and configured to generate an elastic force acting on the restraining dial so that the restraining pin is inserted into the selected one hole.

12. The rehabilitation exercise device of claim 1, further comprising:

a first guide rod extending in length from the first fixing plate toward the first moving plate, and configured to guide reciprocating movement of the first moving plate; and a second guide rod extending in length from the second fixing plate toward the second moving plate, and configured to guide reciprocating movement of the second moving plate.

13. The rehabilitation exercise device of claim 12, further comprising:

a pair of third guide rods extending in length from the hinge shaft toward the first moving plate and the second moving plate, respectively, and configured to guide reciprocating movement of the first moving plate and the second moving plate.

14. A rehabilitation exercise device for upper and lower limbs, the rehabilitation exercise device comprising:

a first support configured to support supporting a user's hand or foot;

a second support configured to support supporting the user's forearm or calf;

a pair of first hinges configured to rotatably connect rotatably connecting the first support and the second support to each other;

a third support configured to support supporting the user's upper arm or thigh;

a pair of second hinges configured to rotatably connect rotatably connecting the second support and the third support to each other; and a distance adjustment part configured to adjust a distance between the first support and the third support by adjusting a length of the second support.

* * * * *